(12) United States Patent
Snyder

(10) Patent No.: US 8,920,140 B2
(45) Date of Patent: Dec. 30, 2014

(54) PURIFICATION SYSTEM

(71) Applicant: Global Solar Water and Power Systems, Inc., Poway, CA (US)

(72) Inventor: Mark E. Snyder, Poway, CA (US)

(73) Assignee: Global Solar Water Power Systems, Inc., Poway, CA (US)

(*) Notice: Subject to any disclaimer, the term of this patent is extended or adjusted under 35 U.S.C. 154(b) by 0 days.

(21) Appl. No.: 13/757,484

(22) Filed: Feb. 1, 2013

(65) Prior Publication Data

US 2013/0142677 A1    Jun. 6, 2013

Related U.S. Application Data

(63) Continuation of application No. PCT/US2011/046671, filed on Aug. 4, 2011.

(60) Provisional application No. 61/389,636, filed on Oct. 4, 2010, provisional application No. 61/400,957, filed on Aug. 4, 2010.

(51) Int. Cl.
| | |
|---|---|
| B01D 24/00 | (2006.01) |
| B01D 61/00 | (2006.01) |
| B01D 61/02 | (2006.01) |
| C02F 1/44 | (2006.01) |
| C02F 9/00 | (2006.01) |
| F04C 2/16 | (2006.01) |

(52) U.S. Cl.
CPC ............ *B01D 61/025* (2013.01); *F04C 2/16* (2013.01)
USPC ........... 417/411; 417/313; 210/184; 210/258; 210/652

(58) Field of Classification Search
USPC ............ 417/313, 410.3, 410.5, 411; 210/149, 210/184, 321.65, 321.66, 258, 637, 652
See application file for complete search history.

(56) References Cited

U.S. PATENT DOCUMENTS

| | | | | |
|---|---|---|---|---|
| 4,248,258 | A | * | 2/1981 | Devitt et al. ............. 137/124 |
| 4,802,829 | A | * | 2/1989 | Miller ....................... 417/12 |
| 6,804,962 | B1 | | 10/2004 | Prueitt |
| 7,373,787 | B2 | * | 5/2008 | Forsberg et al. ........... 62/285 |
| 8,186,518 | B2 | * | 5/2012 | Barker et al. .......... 210/416.3 |
| 8,273,156 | B2 | * | 9/2012 | Dole ........................ 95/247 |
| 8,470,179 | B2 | * | 6/2013 | Al-Arifi et al. .......... 210/640 |
| 2003/0015471 | A1 | | 1/2003 | Reichwein et al. |
| 2005/0269254 | A1 | | 12/2005 | Roitman |
| 2006/0065597 | A1 | | 3/2006 | Kunczynski |
| 2006/0196836 | A1 | | 9/2006 | Arakel et al. |
| 2008/0100037 | A1 | | 5/2008 | Greene, III et al. |
| 2009/0000771 | A1 | | 1/2009 | Horn et al. |
| 2009/0035067 | A1 | | 2/2009 | Wilson et al. |

OTHER PUBLICATIONS

International Search Report for International Application No. PCT/US2011/046671 dated Feb. 27, 2012.

* cited by examiner

*Primary Examiner* — Peter J Bertheaud
(74) *Attorney, Agent, or Firm* — Foley & Lardner LLP

(57) ABSTRACT

A system and method is provided for filtration and purification of a liquid. A purification system can be used for filtration and purification of water. A system can include a raw water treatment system, an ultra filtration system, a reverse osmosis purification system, and a solar power system. A purification system can include hardware and controls for decreasing energy use and system inefficiency by monitoring and controlling temperatures of individual components, of the system, or of the purified liquid. A purification system can include a wetted ground and ground monitoring system control or improve the effectiveness of a ground.

15 Claims, 27 Drawing Sheets

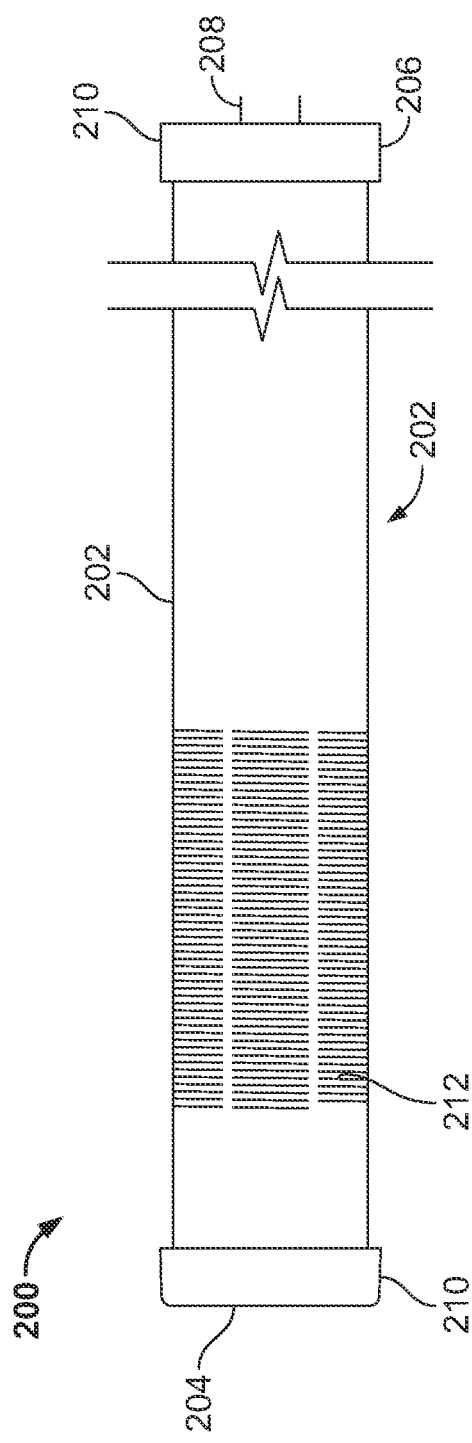
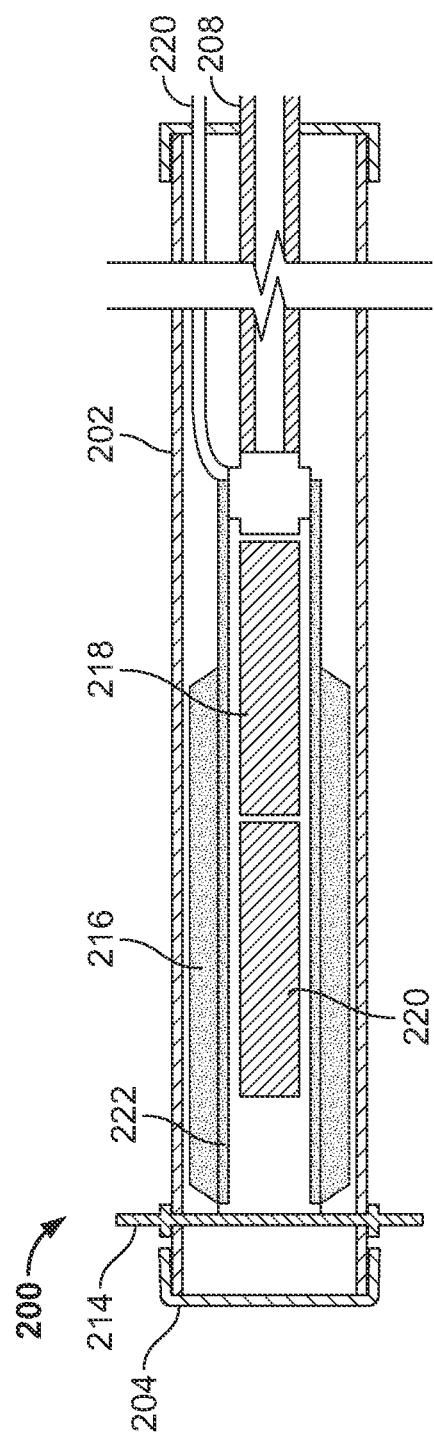
FIG. 2a
FIG. 2b

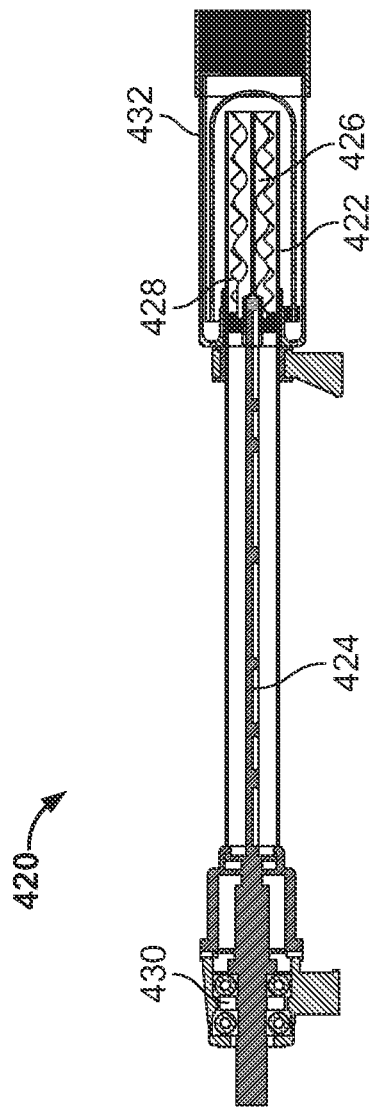
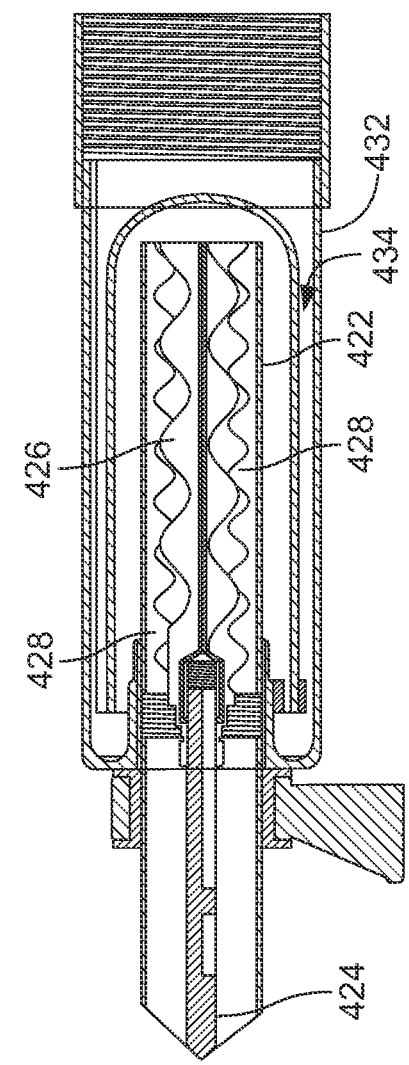
FIG. 7a
FIG. 7b

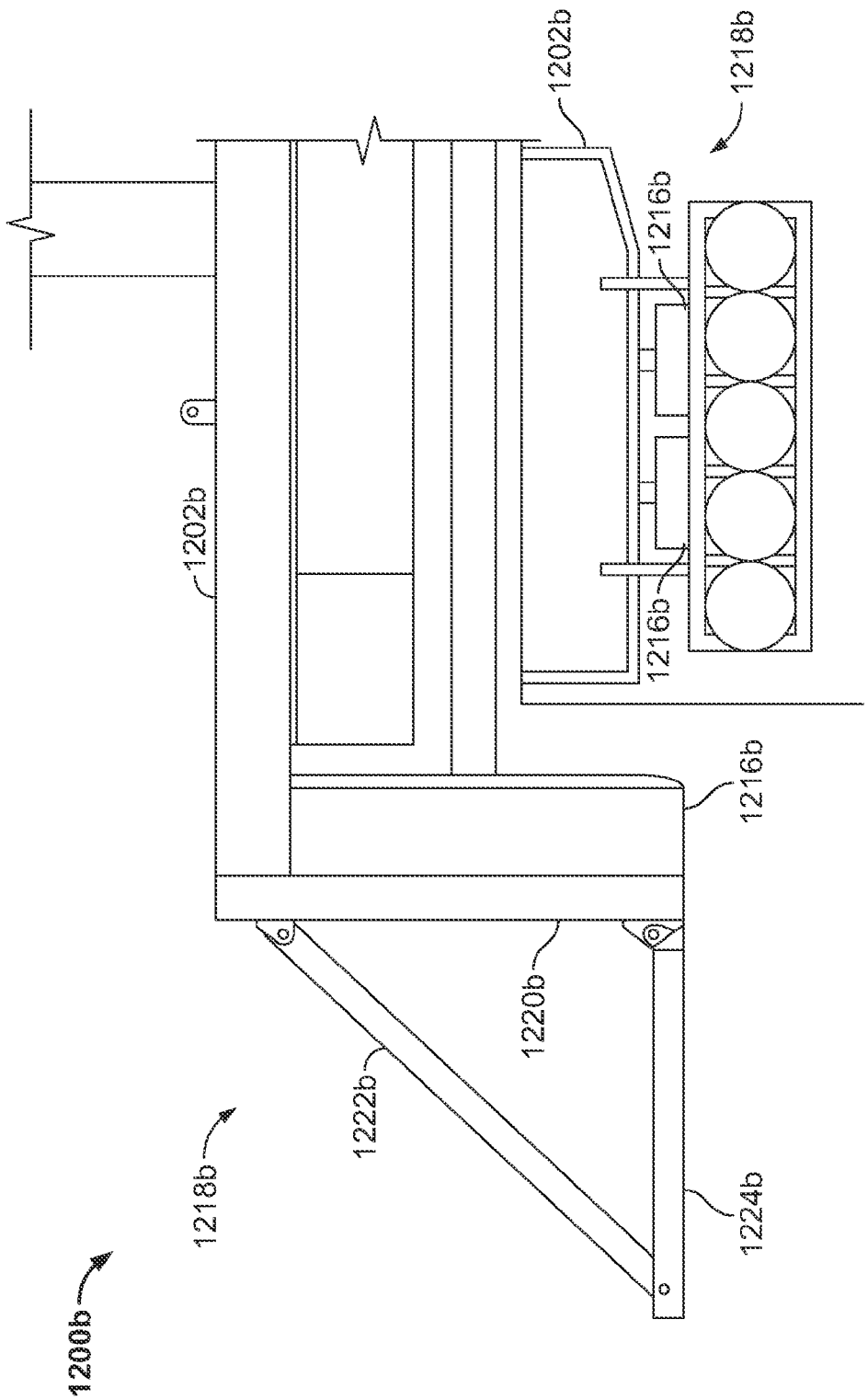

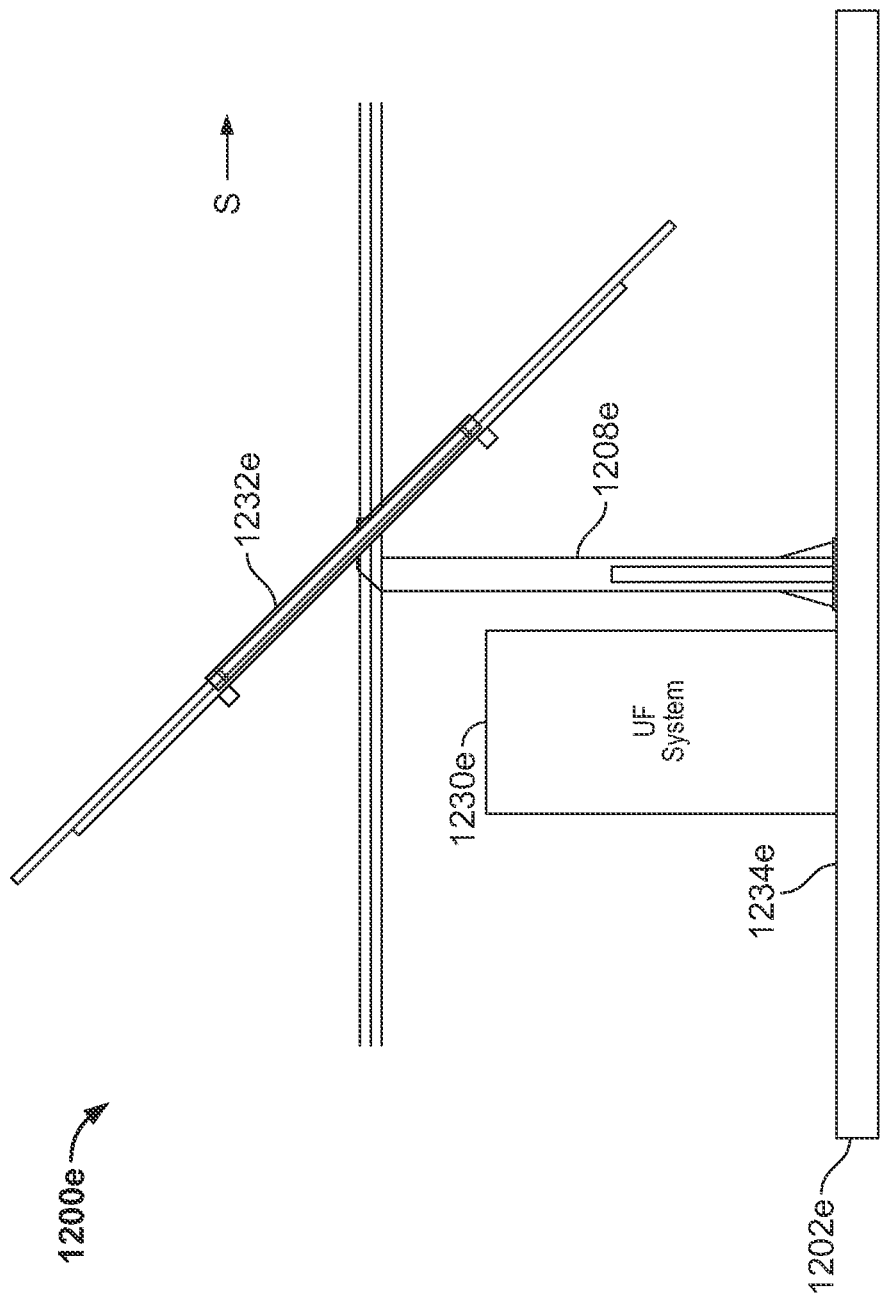

PURIFICATION SYSTEM

CROSS-REFERENCE TO RELATED APPLICATIONS

This application is a continuation of PCT Application No. PCT/US2011/046671, filed Aug. 4, 2011, which claims the benefit of U.S. Patent Application No. 61/400,957, filed Aug. 4, 2010, and U.S. Patent Application No. 61/389,636, filed Oct. 4, 2010, the entirety of each of which is incorporated by reference herein.

BACKGROUND

Field

The specification relates generally to the field of purification and filtration.

SUMMARY

In some embodiments, a pump unit can be configured for use with a high pressure reverse osmosis system. The pump can be further configured, for example, to generate a desired pressure to allow processing of a fluid. In some aspects, for example, the pump can be configured to generate at least 10 pounds per square inch of pressure, 25 pounds per square inch of pressure, 50 pounds per square inch of pressure, 100 pounds per square inch of pressure, or any other desired pressure. In some embodiments, the pump unit can include, for example, a rotor pump, a helical rotor pump, or any other pump configured to generate a desired pressure to allow processing of a fluid, such as, at least 10 pounds per square inch of pressure, 25 pounds per square inch of pressure, 50 pounds per square inch of pressure, 100 pounds per square inch of pressure, or any other desired pressure. Additionally, the pump can be configured to receive solar direct power from at least one solar panel. A pump unit can further include a shroud extending over at least a portion of an outside circumferential edge of the pump. The shroud can further include at least one channel configured for through-flow of process fluid. Additionally, in some embodiments, the pump unit can be configured for the through-flow of process fluid through the shroud, the channel, and the pump, the process fluid cooling the pump unit.

In some embodiments, the shroud can cover the outside circumferential edge of the process fluid pressurizing components of the pump. In additional embodiments, a pump unit can further include at least one or an array of solar panels configured to generate a desired range of electrical power. In further embodiments, the pump unit can receive power from one of at least one generator, at least one battery, or electricity from at least one electric grid.

An alternate embodiment of a system for purification of water can include a pump configured to generate sufficient pressure to process fluid at the desired rate. The pump can include a shroud extending over the outside circumferential edge of pump and the shroud can further include channels configured for through-flow of process fluid. Additionally, the pump can be configured for the through flow of process fluid to cool the pump. In some embodiments, the system can further include a pump controller configured to receive power from at least one solar panel, and can be further configured to control a pump by regulating power from the at least one solar panel to the pump. In some embodiments, the pump controller can be thermally connected to a pump controller radiator, and can include channels configured for the through-flow of process fluid. Additionally, in some embodiments, the radiator can transfer heat from the pump controller to the process fluid. In some additional embodiments, the shroud and the pump controller radiator can be configured to decrease the pressure differential across the reverse osmosis membrane required to purify process liquid by heating the process liquid.

In some embodiments, the system further can include a heat transfer device configured to collect ambient heat to additionally transfer heat to the process fluid. In other embodiments, the heat transfer device can be configured to transfer heat to the reverse osmosis system. In some embodiments, the heat transfer device can include a water heating solar panel.

In some embodiments, the system can include an array of solar panels configured to generate a desired range of electrical power. The system can further include, in some embodiments, powering the system with at least one generator, at least one battery, or electricity from at least one electric grid.

In some embodiments, the process fluid can be pre-filtered. In other embodiments, the process fluid can be raw.

One embodiment of a method of purifying water using a solar-powered reverse osmosis system can include heating process liquid by passing the liquid through a pump unit. Additionally, in some embodiments, the pump unit can include a helical rotary pump and a shroud. In some embodiments, the shroud can include channels configured for flow of the process liquid around the pump. In some embodiment the efficiency of the pump unit can increase by transferring heat from the pump unit to the process liquid. In some embodiments the method further can include heating process liquid by passing the liquid through a heat transfer device in thermal communication with a pump controller. Additionally, in some embodiments, the efficiency of the pump controller can increase by transferring heat from the pump controller to the process liquid. Additional embodiments of the method can include purifying the process liquid by diffusing a portion of the process liquid through at least one reverse osmosis membrane. In some embodiments, the pressure differential across the membrane required to diffuse a portion of the process liquid can be decreased by the increased temperature of the process liquid.

In some embodiments, the method can further include heating process liquid by passing the liquid through a heat transfer device configured for transferring ambient heat to the process liquid. In other embodiments, a thermostat can be coupled to the heat transfer device to maintain a range of designated temperatures of the process liquid. The heat transfer device can further include a solar water-heating panel. Additional embodiments of the method can further include transferring heat through a heat transfer device from the process liquid to the interior of a housing surrounding the reverse osmosis membrane. In other embodiments, a thermostat can be coupled to the heat transfer device to maintain a range of designated temperatures within the housing.

Some embodiments of a method of using solar panel generated electricity to purify liquid with a reverse osmosis system can include generating electricity with at least one solar panel, wherein the solar panel can be mounted on a passive tracker base. Some embodiments of a method additionally can include controlling electricity sent directly to a pump from the solar panel with a pump controller, and the pump controller can, in some embodiments, regulate the amount of power sent to the pump to match purified process liquid needs. Additional methods of using solar power generated electricity to purify liquid can include cooling the pump or the pump controller by transferring heat from the pump or the pump controller to the process water through at least one heat exchanger in thermal connection with either the pump or the pump controller. Additionally, the transfer of heat from the pump or the pump controller can, in some embodiments, decrease the required pressure differential to diffuse a portion of the process water through the reverse osmosis membrane.

In some embodiments, the at least one solar panel mounted on the tracker base can be positioned towards the sunrise in advance of the sunrise.

Some embodiments of a pump unit configured for use in pumping fluids can include a pump configured to pump fluid at the desired rate. Additional embodiments of a pump unit can include a shroud extending over at least a portion of an outside circumferential edge of the pump. In some embodiments, the shroud can include at least one channel configured for through-flow of process fluid. Additionally, in some embodiments, the pump unit can be configured for the through-flow of process fluid through the shroud, the channel, and the pump, the process fluid cooling the pump unit.

Some embodiments disclose a purification system. A purification system can include, for example, a water delivery system. A water delivery system can deliver water, including raw or unprocessed water. In some embodiments, a water delivery system can deliver fluids other than water, or in addition to water. A water delivery system can have straw with an opening or apertures on the opening that is sized and shaped to allow water to pass into the straw and to prevent object larger than the opening from passing into the straw. A water deliver system can include a first filter that is sized and configured to remove particulates of a first desired dimension from the water. The first filter can be a variety of types of filters, including a natural filter or a synthetic filter, an aggregate filter, a membrane filter, or any other type of filter. A water delivery system can include a submerged pump.

A purification system can include a water filtration system. A water filtration system can have a second filter that is sized and configured to remove particulates of a second desired dimension from the water. The second filter can be a variety of types of filters, including a natural filter or a synthetic filter, an aggregate filter, a membrane filter, or any other type of filter. A water filtration system can include a filter membrane and a control system that monitors and manipulates the water temperature.

A purification system can include a reverse osmosis purification system. A reverse osmosis purification system can have a pump with a shroud that extends over at least a portion the outside circumferential edge of pump. In some aspects, the pump can generate sufficient pressure to process fluid at the desired rate. A pump can, for example, generate pressures between 25 and 500 pounds per square inch, or any pressure therebetween. A pump can be configured to generate pressures to deliver fluid at any desired rate. For example, fluid can be delivered at rates between one-tenth of a gallon per minute to one thousand five hundred gallons per minute. A reverse osmosis purification system can include a reverse osmosis membrane.

Some embodiments of a purification system can include a power system that provides electrical power to the other systems of the purification system.

Some embodiments disclose a method of generating electricity to purify liquid with an ultra filtration and reverse osmosis system. The method can include, for example, generating electricity with at least one solar panel that is mounted on a passive tracker base. The passive tracker base can include a first chamber in a first position on a passive tracker base that is in fluid communication with a second chamber in a second position on the passive tracker base. The different positions of the first and second chambers can provide for differential heating of the two chambers based on the position of the sun relative to the passive tracker base that results in the movement of a material or between the two chambers, and thereby results in the movement of the solar panel. The material or substance, for example, can be a solid, a liquid, a gas, a plasma, or any other phase of material. The passive tracker base may include a heating element attached to the first chamber that heats the first chamber and thereby moves the solar panel. The method may include controlling electricity sent directly to a pump from the solar panel with a pump controller, for example, a controller that matches the amount of power sent to the pump to purified liquid needs.

Some embodiments disclose a fluid delivery system, for example, an unprocessed or a raw water delivery system. For convenience it will be described as a "raw water" delivery system, although other fluids can be delivered. A raw water delivery system may include a straw that has an opening sized and shaped to allow water to pass into the straw and to prevent objects larger than the opening or apertures on the openings from passing into the straw. A raw water delivery system can include a filter that is sized and configured to remove particulates of a first desired dimension from the water and a perforated air tube that is connected to a source of pressurized gas to thereby allow delivery of pressurized gas to the raw water delivery system to clean the first filter and the opening on the straw, and a submerged raw water delivery pump.

Some embodiments disclose a method of controlled grounding of an electrical system. A method of controlled grounding of an electrical system may include, for example, one or more of inserting a ground into a grounding material, delivering a desired quantity of water to the grounding material around the ground, measuring the flow rate of the water, measuring a parameter of the grounding material proximate to the ground, varying the water flow rate based on the measured parameter, and signaling an alarm when the measured parameter is outside an acceptable range. An alarm can be signaled, for example, when the resistance of the grounding material exceeds a threshold, such as, 1 ohm, 5 ohms, 10 ohms, 100 ohms, or any other resistance, or when the water flow rate falls below a threshold, such as, for example, 100 gallons per day, 50 gallons per day, 25 gallons per day, 10 gallons per day, 5 gallons per day, one gallon per day, or any other rate.

The foregoing is a summary and thus contains, by necessity, simplifications, generalization, and omissions of detail; consequently, those skilled in the art will appreciate that the summary is illustrative only and is not intended to be in any way limiting. Other aspects, features, and advantages of the devices and/or processes and/or other subject matter described herein will become apparent in the teachings set forth herein. The summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

FIG. 2a is an example of a side view one embodiment of a raw water delivery sub-system.

FIG. 2b is an example of a cross-sectional view of one embodiment of a raw water delivery sub-system.

FIG. 7a is an example of a cross-section view of one embodiment of a pump for a reverse osmosis purification system.

FIG. 7b is an example of a zoomed cross-section view of one embodiment of a pump for a reverse osmosis purification system

FIGS. 12a-12g depict aspects of some embodiments of a reverse osmosis system and/or an ultra filtration system mounted on a single trailer.

DETAILED DESCRIPTION

Figure 1:
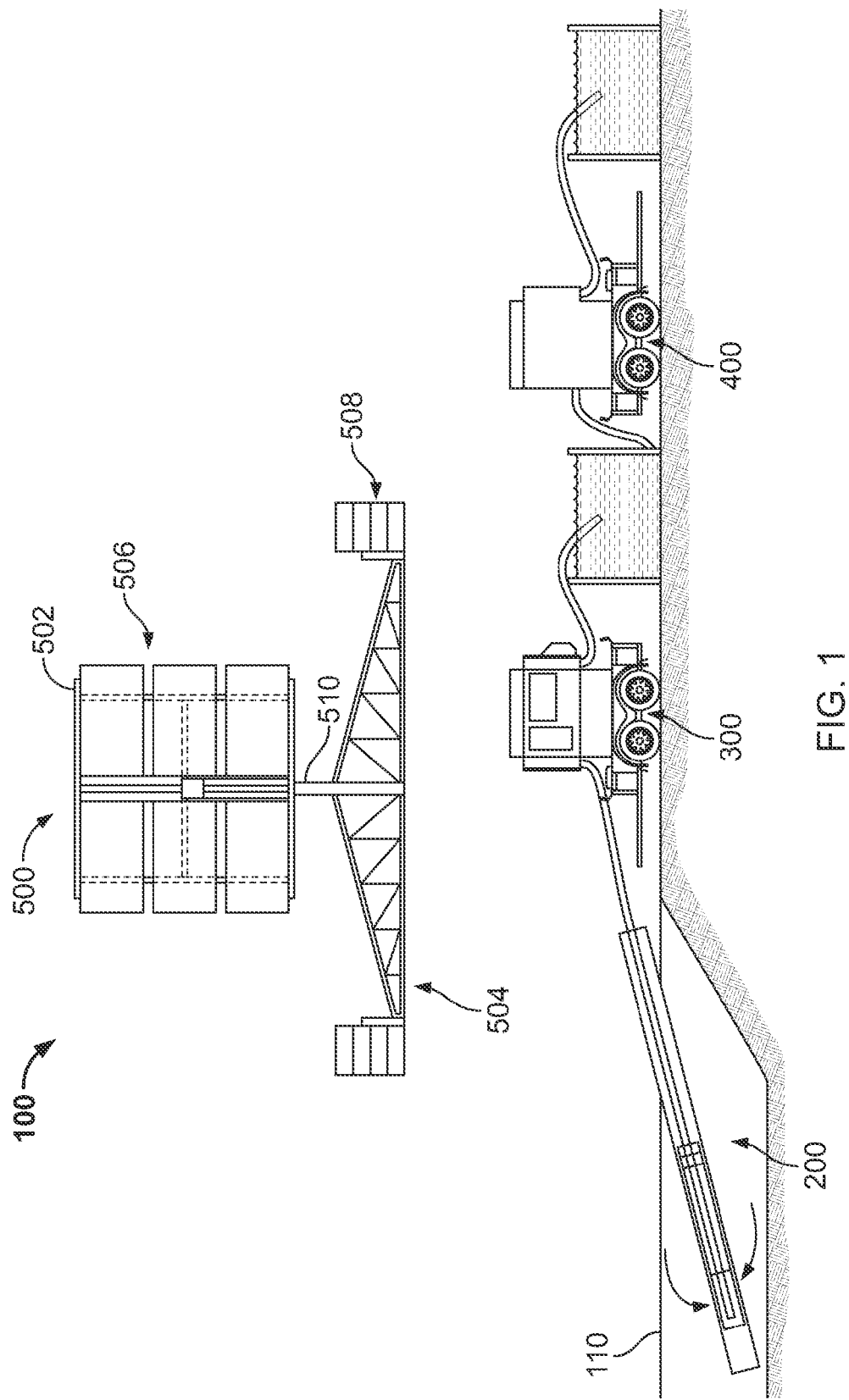
FIG. 1 depicts an example of one embodiment of a solar powered reverse osmosis system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

Some embodiments disclosed herein relate generally to solar powered reverse osmosis systems and methods of making and using such systems. Also, some embodiments relate to the individual components and subparts of the systems described herein, as well methods of making and using the same. In some embodiments a solar powered reverse osmosis system may be configured for purification of fluids, for example water. Additionally, such a system may include, for example, one or more of a raw water delivery sub-system, a water filtration sub-system, a reverse osmosis system, or a solar energy sub-system. For example, without being limited thereto, the systems and methods can be used for reverse osmosis purification of water from rivers, streams, lakes, oceans, estuaries, flood zones, waste water containment structures, wells, and the like. In other embodiments, a solar powered reverse osmosis system may include, for example, additional or fewer sub-systems or be configured for purification of substance other than water. However, a person skilled in the art, having the instant specification, will appreciate that the solar powered reverse osmosis systems and methods of use of such systems disclosed herein can be applied to purification of a wide range of substances in a variety of states.

The following descriptions refer to several features of a reverse osmosis system. Several of the features are described in association with one particular sub-system of the reverse osmosis system. A person skilled in the art will recognize that these general features can be incorporated into any sub-system of the reverse osmosis system to achieve results similar to those achieved in connection with use of the feature with another sub-system.

FIG. 1 depicts an example of one embodiment of a solar powered reverse osmosis system 100. The solar powered reverse osmosis system 100 depicted in FIG. 1 is configured for water purification. Additionally, the solar powered reverse osmosis system 100 includes separate systems, namely, a raw water delivery system 200, a water filtration system 300, a reverse osmosis purification system 400, and a solar energy system 500. A person skilled in the art will recognize that embodiments of a solar powered reverse osmosis system may include additional systems not depicted in FIG. 1. Similarly, other embodiments of a solar powered reverse osmosis system may not include one or more of the separate systems depicted in FIG. 1. It should be noted that although the systems, subsystems and components herein generally are described in connection with their application to and use with water, the systems, subsystems and components may be used with other fluids in addition to or besides water.

Raw Water Delivery System

A raw water delivery system 200 delivers raw water from the raw water source 110 to the ultra filtration unit 300. Although this system is described in connection with delivering water, it also may be used for delivery of other fluids and substances. By "raw" water, it is meant that the system can deliver water that is still to go through the filtration process. The raw water may include other substances and fluids, for example, impurities, substances and fluids that are to be filtered out by the system 100.

In one preferred, non-limiting embodiment of a raw water delivery system 200, the system delivers pre-filtered water to the ultra filtration unit 300. In another embodiment of a raw water delivery system 200, the system includes a pump configured to pump water from the raw water source through the ultra-filtration unit 300. Further, a raw water delivery system 200 may include insulation to protect the raw water from exposure to light and heat.

FIGS. 2a-2b depict elements of examples of one embodiment of a raw water delivery device 200. FIG. 2a is a side view of one embodiment of a raw water delivery system 200. The raw water delivery system 200 may include, for example, a tube or pipe that is referred to as a "straw" 202. It should be understood that the "straw can have a variety of geometric shapes and orientations. Generally, the straw can be configured for gathering and/or transporting fluid to other sub-systems or parts of the system. A straw can include, for example a portion or volume for collecting a fluid such as raw water. This portion or volume can be defined by a wall having at least one opening for allowing the fluid to flow into the straw. While the straw can have any shape or orientation, generally, in some embodiments a straw includes a lumen through which the fluid, such as the raw water, can pass, be transported or be delivered, for example. A straw 202 can include or be made of a variety of materials including, for example, metal, plastic, composites, or ceramics. In preferred embodiments, a straw 202 comprises a polyvinyl chloride (PVC) pipe and can, in some preferred embodiments, have a length of 20 feet. It should be noted that various sizes, lengths and shapes of straw can be used. The length can be any range that is desired and can be determined based upon the desired length to be able to access the desired fluid that is to be filtered. For example, the length can be between about 10 feet and 200 feet, more preferably, about 15 feet to 100 feet, or 20-50 feet. The diameter can be any suitable diameter that will be sufficient for the filtration requirements and needs. The diameter can range for example from about 1 inch up to 100 inches, for example. Preferably the straw has a size or diameter of about 5 inches to about 40 inches, more preferably about 10-30 inches. The shape can be tubular with a circular cross section, it can have a geometric cross section (e.g., octagonal, rectangular, square, etc.). The straw can have a non-tubular shape, such as, for example, a spherical shape, a rectangular shape, a triangular pyramidal shape, or any other desired shape. Furthermore, the depicted straw has a cross sectional shape that is circular or round. It should be appreciated that a straw can have other cross section geometries. For example, a straw can have a triangular, rectangular, square, oval, or any other cross sectional shape. The straw can be made of any suitable material. It can be at least partially made of a collapsible material, a rigid material, a flexible material, an expandable material, and combinations of the same, etc.

FIG. 2a depicts an embodiment in which the straw 202 comprises an elongated tube having an inlet end 204, into which fluid enters the water delivery device 200. The straw 202 further includes an outlet end 206. The outlet end 206 further comprises an opening through which a water/fluid line 208 passes which water/fluid line 208 carries water to the filtration unit. One or both of the inlet and outlet ends 204, 206 can be covered by a cap 210. The straw 202 further may include openings 212 allowing the passage of water from outside the straw 202 to inside the straw 202. In the embodiment depicted in FIG. 2a, openings 212 include multiple series of circumferentially extending slits referred to as "gill slits." A gill slit may be sized, for example, based on the specific water production needs for the solar powered filtration system 100 and on the maximum allowable size of particulate entering into the straw 202. In preferred embodiments, a straw having a diameter of between about 5 inches and 40 can include gill slits that are approximately six to eight inches long and between one-quarter and one-half inch wide. Similarly, one or several sets of gill slits are sized according water production needs for the solar powered filtration system 100. A person skilled in the art, having the instant specification, will recognize that a variety of shaped vessels may be used as a straw 202 and that a straw 202 may be used with or without caps 210. A person skilled in the art will further recognize that openings 212 are not limited to gill slits, but that this disclosure includes all shapes of opening, including for example, holes of various shapes (circles, ovals, squares, rectangles, etc.).

FIG. 2b is a cross section view of the embodiment of a raw water delivery system 200 depicted in FIG. 2a. As shown in FIG. 2b, bolt 214 can pass through the straw 202 in proximity to the inlet end 204. In some embodiments, one or more cables can be affixed to the ends of the bolt 214. In preferred embodiments a single jacketed cable, for example, a one-quarter inch jacketed cable, can be attached to each end of the bolt 214. Advantageously, these cables can enable fixing the position of the straw in a body of water.

As shown in FIG. 2b, a gravel pack 216 is inserted into the straw 202. FIG. 2b depicts a gravel pack 216 comprising an elongate tube. The gravel pack 216 may be sized to slidably fit within the straw 202, and to rest on top of the bolt 214. A submersible pump 218, sized to fit within the gravel pack 216, is inserted into the gravel pack 216. In preferred embodiments, the submersible pump 218 may include, for example, a Grundfos® pump controlled by a separately located Grundfos™ controller. In some embodiments of a raw water delivery system 200, a cable can be affixed to one end of the pump enabling the removal of the pump from the straw without removing the straw from the water.

In preferred embodiments of a raw water delivery system 200, the location and size of sets of openings 212 in the straw 202 may correspond to the size and longitudinal position within the straw of the gravel pack 216. In preferred embodiments, the gravel pack 216 and the sets of openings 212 may be sized and located such that water flowing through the openings 212 flows first through the gravel pack 216 before reaching the pump 218. More specifically, a gravel pack of preferred embodiments rests on top of the bolt 214 and is between three and four feet long. Similarly, the sets of gill slits of preferred embodiments start at the outlet end side of the bolt and extend the same length as the gravel pack.

Additional embodiments of raw water delivery system 200 further can include one or more bodies extending through the outlet end of the straw and into the straw. In some embodiments this body may include a water/fluid line 208 that leads water from the pump in the straw to the filtration system 300. This body can further include an electric cable for providing power and control to the water pump 218. In the embodiment shown in FIG. 2b, the electric cable is integral with the water line. In a further embodiment, this body can also comprise one or more tubes. This can include an air tube 220 having a perforated end 222 or a vacuum tube (not shown) extending to the inlet end of the straw. Advantageously, inclusion of a perforated air tube may enable users of the straw 202 to clean the gravel pack 216 and the straw 202 by blowing compressed air out of the tube 220 and through the gravel pack 216 and openings. This removes accumulations from the gravel pack 216 and straw 202 and enables more efficient filtration by decreasing the frequency of necessary filter shutdown for straw 202 and gravel pack 216 cleaning and by decreasing the flow resistance caused by a dirty gravel pack 216. The inclusion of a vacuum tube similarly increases the efficiency of filter operation by decreasing the frequency of straw 202 cleaning by allowing the user to suck particulate accumulations out of the straw 202 without removing the straw 202 from the water.

The use of the raw water delivery system 200 can provide several significant and surprising benefits. Surprisingly, the use of the straw 202 can decrease the size of the pump 218 and other filtration components required to process an equal amount of water. These size decreases result in greater energy and weight savings. Additionally, the use of a raw water delivery system 200 can significantly increase the life of the pump 218 and any other pump in the system (e.g., a pump for the reverse osmosis system such as pump 402 described below). Testing indicates that this increase can be up to between ten and fifteen times the normal pump life. Finally, use of preferred embodiments of the raw water delivery system 200 can provide significant advantages in placement of a pump 218 in a body of water 110. At the time of insertion, preferred embodiments of the raw water delivery system 200 can be air filled. As such, they have a degree of buoyancy which enables easy placement of the raw water delivery system 200. Additionally, as the raw water delivery system 200 is buoyant, the raw water delivery system 200 is not placed by pushing the raw water delivery system 200 across the bottom of a body of water, which pushing can significantly increase the amount of particulate suspended in water. However, as the raw water delivery system 200 contains openings, the raw water delivery system 200 can slowly sink into the water, for example, completely submerging the pump 218. Thus, use of the raw water delivery system 200 can provide the advantages of buoyant positioning and the benefits of a completely submerged pump 218.

Filtration System

Figure 3A:
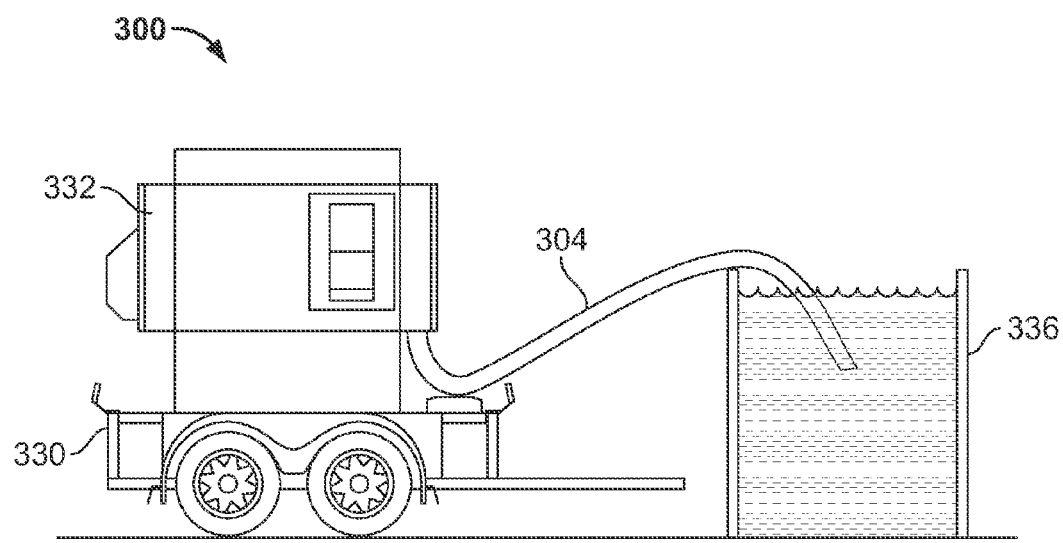
FIG. 3a is an example of a side view of one embodiment of a water filtration system.

FIG. 3*a* depicts one embodiment of a filtration system 300, for example, for filtering water or other fluids.

In one embodiment, the filtration system 300 receives raw water and processes it through several filtration media, producing potable water. Additionally, a variety of other processes can be used to prepare or to assist in preparing the water, including for example, UV light treatment and chemical treatment. In preferred embodiments of a filtration system, mechanical filters and UV light may be used to purify water. However, a person skilled in the art will recognize, particularly in view of the instant specification that the present disclosure is not limited to a particular method of water purification but rather encompasses a broad range of purification methods.

A filtration system can provide a range of filtering to a process fluid, for example, ranging from filtration of large particulate to filtration of fine particulate or to the elimination of bacteria, fungus, viruses, spores, or other undesirable lifeforms.

Figure 3B:
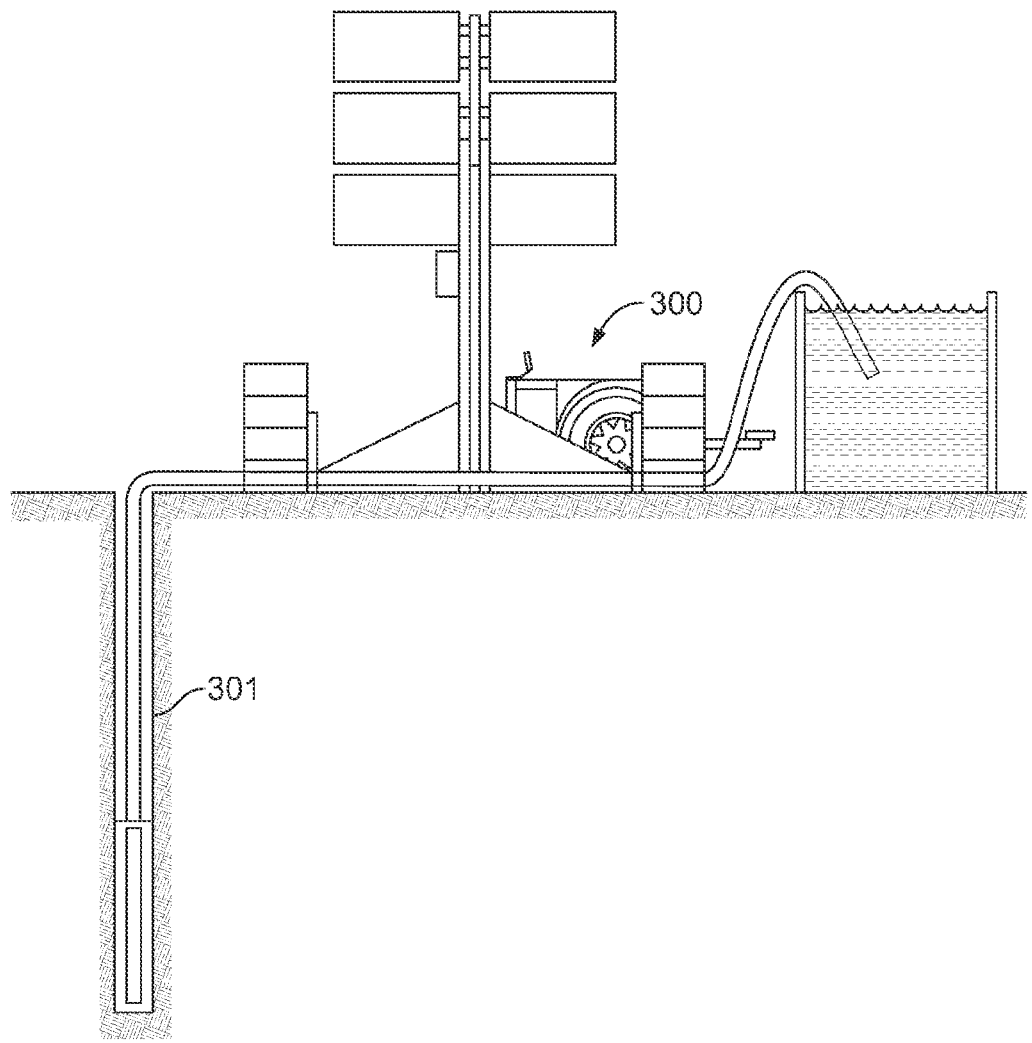
FIG. 3b is an example of a side view of one embodiment of a water filtration system

As depicted in FIG. 3*b*, in some embodiments the systems and methods can be used to treat fluid from a subterranean source, such as a well 301 or spring. In such embodiments, a filtration system 300 may include, for example, one or more of a 5 micron filter (or other suitable size for the desired use), ultra violet treatment, and a sand trap. In some embodiments, the degree of filtration can be configured to match the needs of the water user and the state of the available filterable-fluid. In other embodiments of a filtration system configured for filtering fluid from a surface source, a filtration system may include, for example, a 0.2 micron, or smaller; filter, ultra violet treatment; one or more sand traps; one or more strainers; and/or one or more media filters. A person skilled in the art will recognize that the present disclosure is not limited to the above outlined specific filtration configuration, but encompasses a range of filtering configuration. In some aspects the devices can exclude one or more of the abovementioned components of the systems.

Figure 3C:
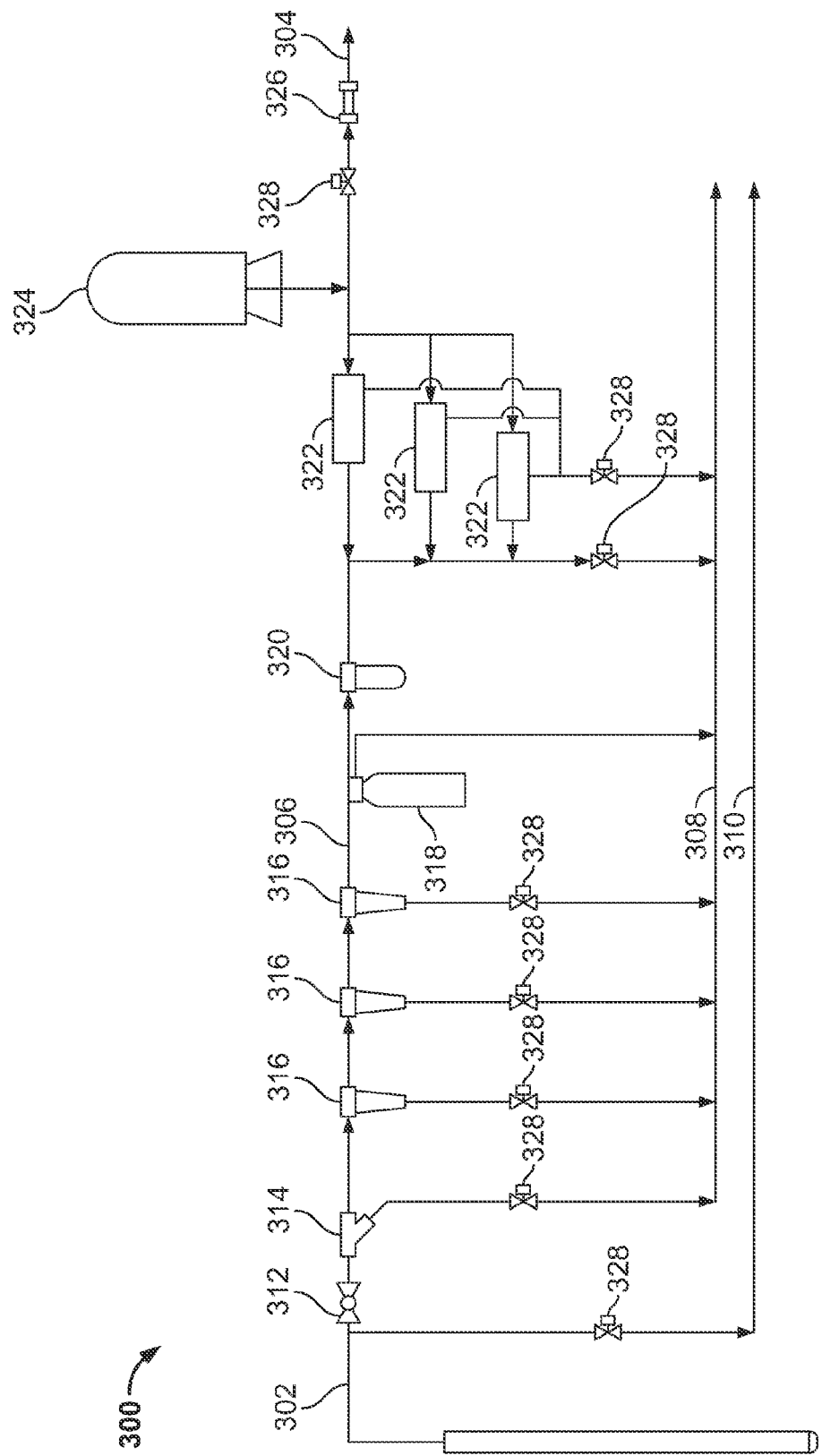
FIG. 3c is an example of a hydraulic schematic of one embodiment of a water filtration system.
Figure 3D:
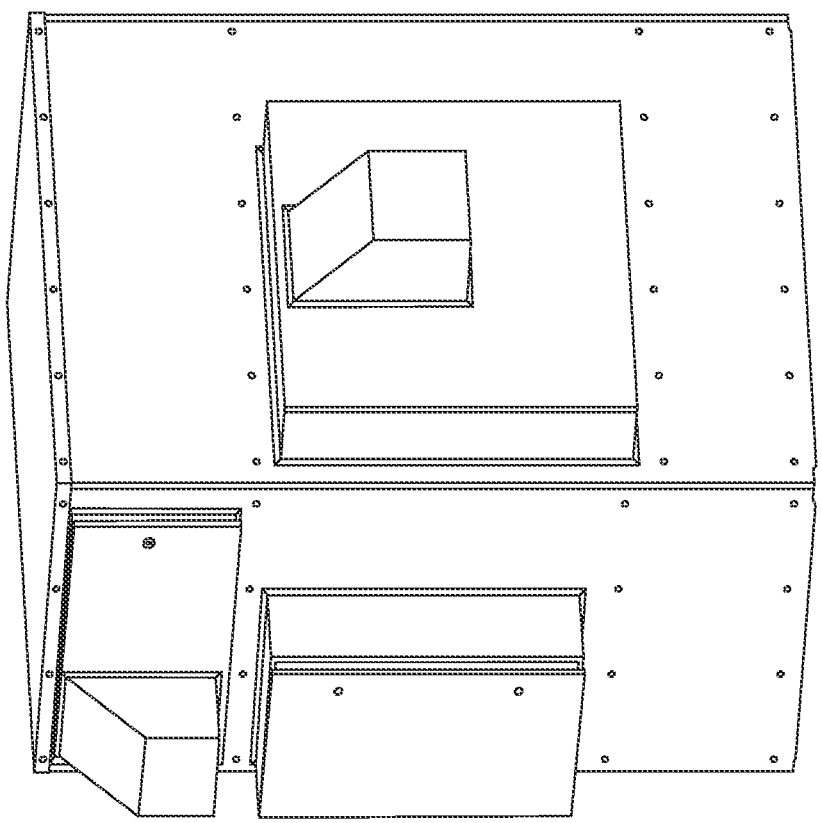
FIGS. 3d-3i depict embodiments of a housing.
Figure 3E:
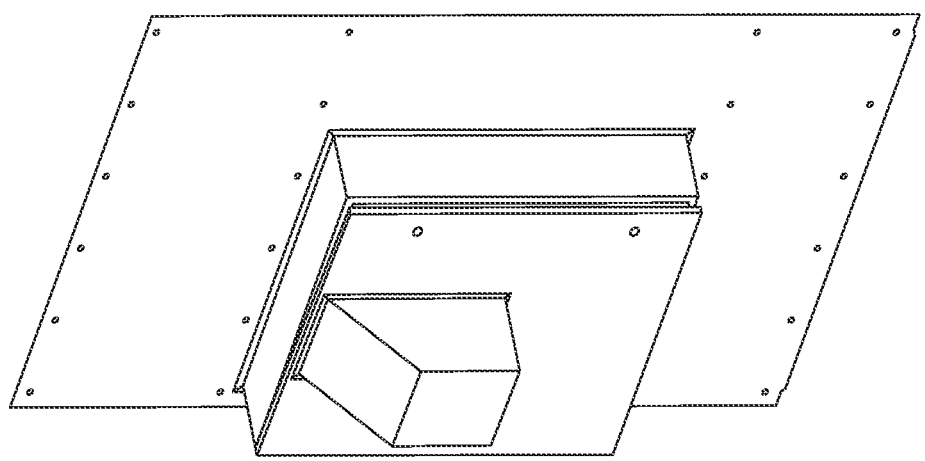
Figure 3F:
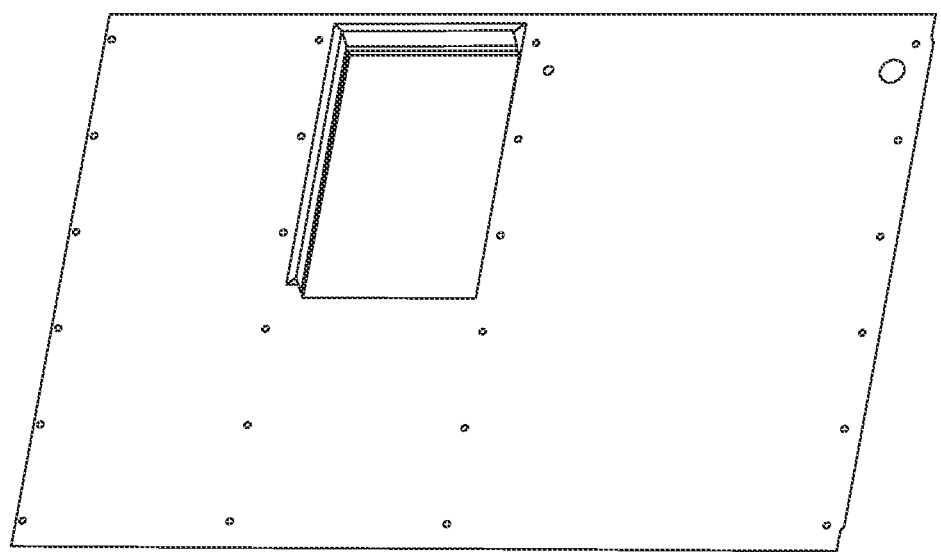
Figure 3G:
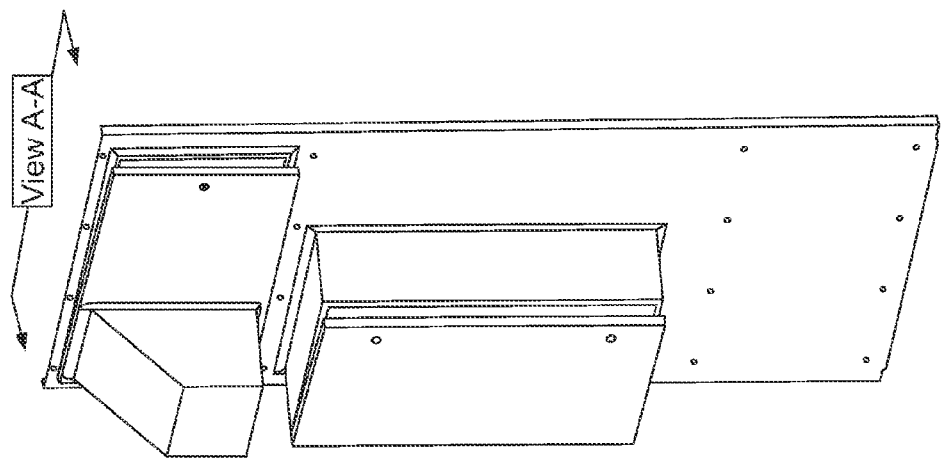
Figure 3G:
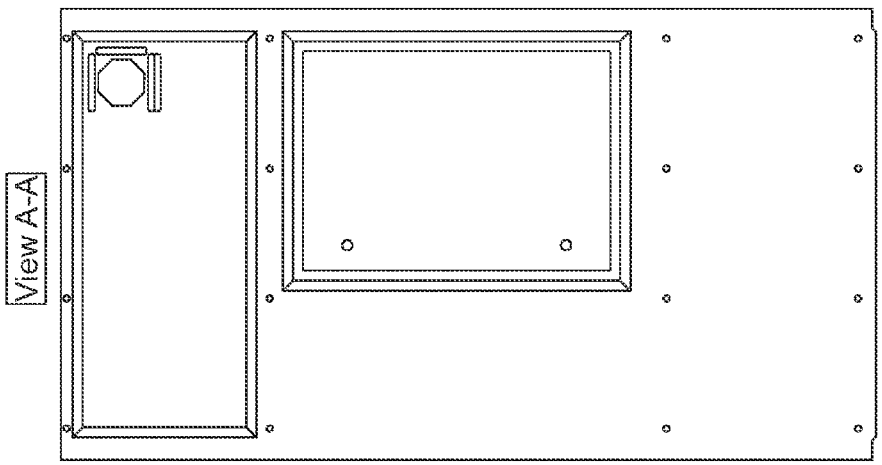
Figure 3H:
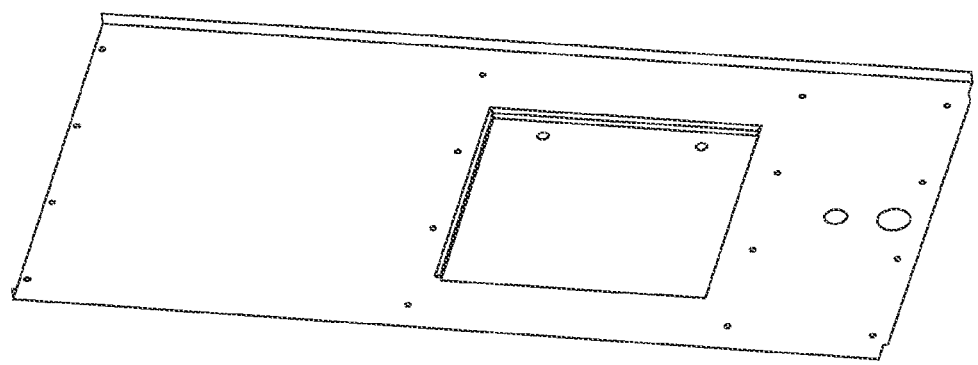
Figure 3I:
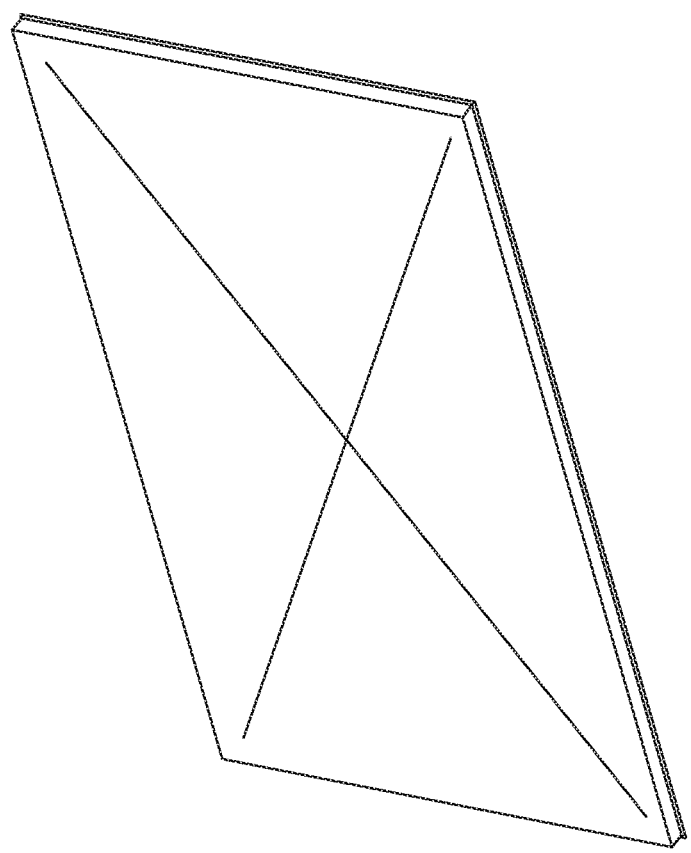

FIG. 3*c* is a hydraulic schematic of an example of one embodiment of a filtration system 300 connected to raw water supply system 100. The filtration system 300 includes a raw water line 302 and a treated water line 304. The raw and treated water lines 302, 304 are connected by a hydraulic flow path 306 that directs process fluid through various steps of the filtration process. The filtration system additionally includes a first drain line 308 and a second drain line 310. In some embodiments, one or both of the first or second drain lines 308, 310 can drain fluid around a grounding point, thereby wetting the grounding point and increasing conductivity between the ground and the ground point. Additionally, in some embodiments, wetting of the area around the grounding point can advantageously create a wetted volume of grounding material underneath the area around the grounding point.

Figure 3J:
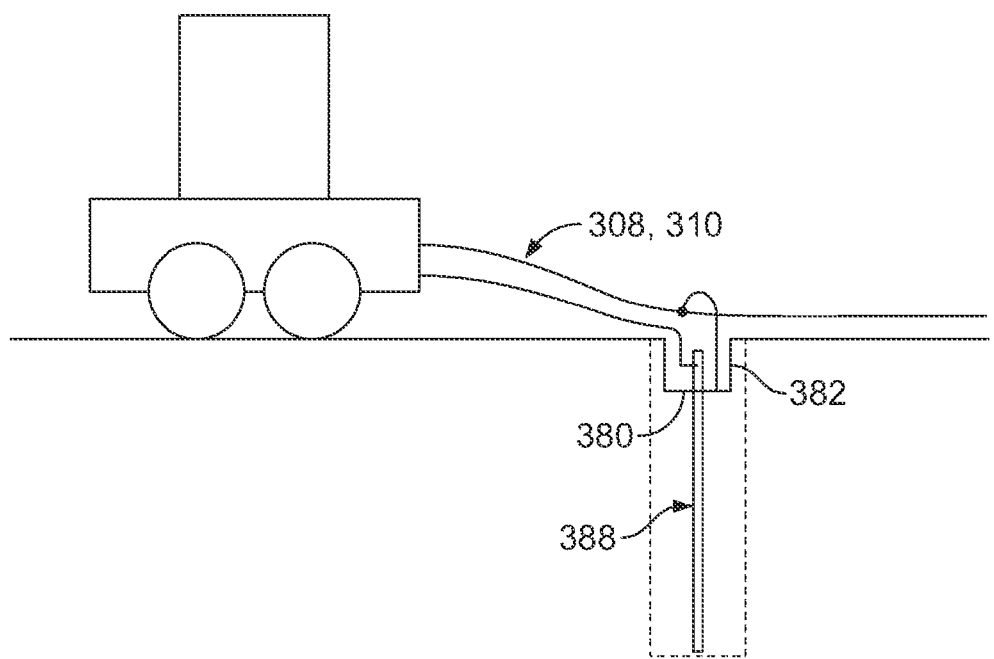
FIGS. 3j-3k depict embodiments of a ground point.
Figure 3K:
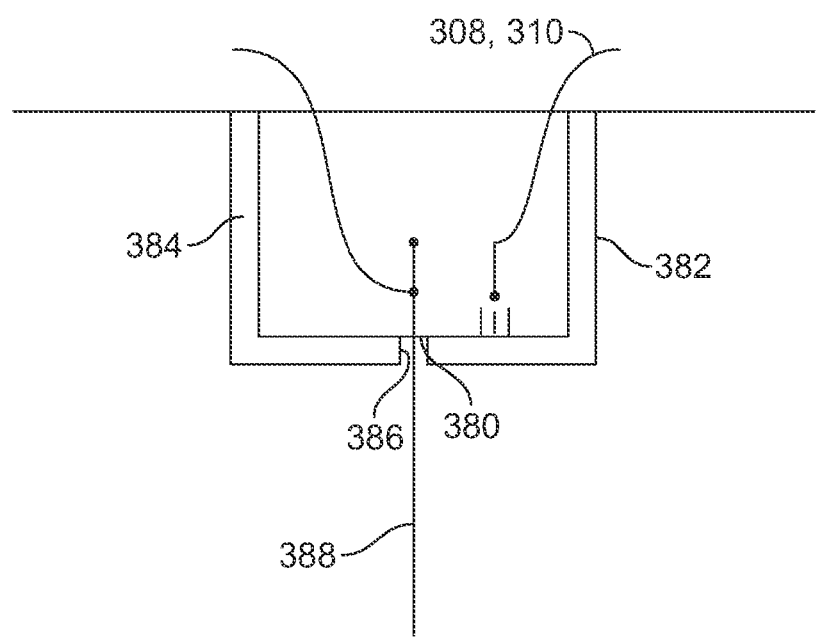

In some embodiments, a grounding material can, for example, be earth, sand, gravel, stone, water, or any other material used as a ground. In some embodiments, this wetted volume can penetrate the grounding material to a sufficient depth to effectively connect the ground to the grounding plane. This advantageously increases the effectiveness of the ground by connecting the grounding rod to a portion of the grounding material having increased conductivity. As depicted in FIGS. 3*j* and 3*k*, the ground point 380 may be improved by creating depression 382 around the ground point 380, the depression 382 configured to catch and store liquid from the drain line 308. This depression can, for example, cylindrically shaped and be twelve inches deep and twelve inches in diameter. The dimensions of the depression can vary based on a variety of factors, including, for example, local climate, climate zone, current temperatures, or soil conditions. Thus, a depression in a cold climate, or in a region with near-surface permafrost, may have different dimensions than a depression in an arid region. In some embodiments, the depression 380 can be lined with plastic, concrete, metal, wood, or other material. In some embodiments with a lined depression 380, the liner 384 can include an orifice 386 through which a grounding rod 388 may be passed, the orifice 386 also allowing water to pass from the depression 380 into the ground around the grounding rod 388. In further embodiments, the drain lines can be configured to provide approximately one gallon per hour to the depression to maintain adequate moisture and conductivity at the grounding point. A person skilled in the art will recognize that a similar ground technique may be used in connection with any of the subsystems of the reverse osmosis system, an ultra filtration system, a pump system, a solar photovoltaic system, a solar thermal system, an electrical system, an electrical subsystem, a transport system for liquid or gaseous agents, such as, for example natural gas, water, or oil, a lighting system, a cathotic protection system, a safety system, or any other system capable of use with a ground. In light of the above disclosure, a person of skill in the art will recognize that a fluid for wetting the grounding point can come from a variety of sources, including a reverse osmosis system or an ultra filtration system, but can also include any water source, and any water type, such as, for example, culinary water, grey water, or irrigation water. It should be noted that one or more of the above-listed components can be specifically excluded from some embodiments.

In some embodiments, the ground point can be monitored. In some embodiments, for example, one or more of the conditions of the ground, the condition of the ground wiring, the conductivity of the ground point, or other factors or parameters relative to the ground can be monitored. In some embodiments, one or more of the aforementioned can be specifically excluded. In some embodiments having a wetted ground, the moisture content of the wetted ground, water flow, or other factors relative to the wetted ground can be monitored. In some embodiments, these factors can be, for example, locally monitored. In some embodiments, these factors can be, for example, remotely monitored. Factors relative to the ground, or relative to any aspect, or sub-system, of one of the raw water treatment system, ultra filtration system, or reverse osmosis system can be locally or remotely monitored. In some embodiments, monitoring can be performed locally, and signals indicative of the measured factors can be transmitted, for example, wirelessly, via satellite, via a wired network, or any other form of transmission. These signals can be received, for example, by cell phone, smart phone, computer, a supervisory control and data acquisition system, smartmeter, datalogger, or any other data display, tracking, or recording system. In some embodiments, a controller can alter a system parameter such as, for example, water flow rate to the grounding point to thereby maintain at least one parameter relative to the ground within a desired range. In one embodiment, for example, the water flow rate can be increased, for example, by approximately 1 percent, 5 percent, 10 percent, 25 percent, 50 percent, 100 percent, or any other value in response to a measured increase in the resistance of the grounding material or to a decrease in the water content of the grounding material. In some embodiments, a monitoring device can be configured, for example, to activate an alarm when received signals are not within acceptable limits. In some embodiments, for example, an alarm may be activated, when a resistance greater than 5 ohms, 10 ohms, 20 ohms, or 50 ohms is measured at 120 watts, when a resistance greater than 5 ohms, 10 ohms, 25 ohms, 50 ohms, or 100 ohms is measured at 500 watts, or when resistance is greater than any other desired level. In some embodiments, an alarm may be activated, for example, when water flow is less than 100 gallons per day, less than 10 gallons per day, less than five gallons per day, or less than one gallon per day.

The embodiment of a filtration system depicted in FIG. 3c further includes a check valve 312, a strainer 314, sand traps 316, a media filter 318, a filter 320, one or more filtration membranes 322, a pressure tank 324, an ultra violet lamp 326, and solenoid valves 328. A person skilled in the art will recognize that the present disclosure is not limited to the above listed specific features of a filtration system 300 but can comprise a variety of elements, features, and connections. It should be noted that one or more of the above-listed components can be specifically excluded from some embodiments.

In some embodiments of a filtration system 300, the check valve 312 is configured to allow unidirectional flow into and through the filtration system while preventing reverse flow. The strainer 312 and sand traps 316 can be configured to remove particulate matter from the process water, in some embodiments, the particulate matter being progressively removed from the water in a range of two-hundred to seventy-five microns. The media filter and the filter remove further particulate ranging, in some embodiments, down to 5 microns, or smaller. The filtration membrane 322 can be configured to remove particulate from the water down to 0.2 microns or smaller, for example.

The pressure tank 324 can be configured to store water and pressure in preparation for a backwash of the filtration system. A backwash may be initiated at any desired time by any suitable methodology. For example, a backwash can, in some embodiments, be initiated by a timer. In other embodiments, a backwash can be initiated, for example, in response to differential pressure. A person skilled in the art will recognize that a backwash can be initiated using a variety of techniques and that the present disclosure is not limited to any particular technique of initiating a backwash.

As described in further detail below, a backwash can be initiated by filling and pressurizing the pressure tank 324. Once a predetermined pressure is reached, the solenoid valves 328 can be opened simultaneously or in a predetermined order to allow flow to the first drain line 308. Fluid from the pressure tank 324 flushes through the ultra filtration module 322, the filter 320, the media filter 318, the sand traps 316, and the strainer 314, cleaning the components and flushing impurities from the filtration system 300 to the first drain line 308. Advantageously, opening of the solenoid valves 328 in a predetermined order can progressively flush different components of a filtration system 300. During the backwash, the check valve 312 prevents backwash fluid from flowing out of the filtration system via the raw water line 302.

In preferred embodiments a water filtration system 300 can be mounted on a trailer 330 and covered by a housing or skin 332. For example, see FIG. 3a. The depicted embodiment has a housing/skin that is made of metal. In other embodiments a housing may be made of other materials including plastic, woods, fiberglass, or composites. A housing may be further configured to be weather resistant, and may, in some embodiments include insulation. In some further embodiments, a housing may include an integrated sun-shade. A person skilled in the art will recognize that the skin can include any material capable of covering the filtration system, and that some embodiments of the filtration system may include a partial housing or it may include no housing at all. Similarly, a person skilled in the art will recognize that the scope of this disclosure is not limited to filtration systems 300 located on a trailer, but rather includes a variety of filtration system bases.

In the embodiment depicted in FIG. 3a, the water filtration system 300 further includes a treated fluid/water line 304 for carrying treated water from the filtration system 300 to a desired destination, which is depicted in FIG. 3 as storage tank 336. In some embodiments of a filtration system 300, filtered water can be delivered directly to users in response to demand for water. In some preferred embodiments of a filtration system 300, processed water is delivered to a storage tank 336. A person skilled in the art will recognize that a variety of natural and manmade containers can be used as a storage tank 336 and that the present disclosure is not limited to use of a specific form of container as a storage tank. In some embodiments of a filtration system 300 in which processed water is stored in a storage tank 336, a float system can communicate water levels in the storage tank 336 to the filtration system controller. The filtration system controller can then, based on signals received from the float system in the storage tank 336, start or stop the pumping and processing of water through the filtration system 300. The stored water can be put to immediate use or can be delivered from the tank for further processing (e.g., further purification such as reverse osmosis purification). In some embodiments, the filtration system can deliver the filtered fluid directly to a further purification system, for example, to a reverse osmosis system as described herein.

FIGS. 3d-3i illustrate examples of skin or housing configurations that may be utilized. The skin or housing can be configured to enclose some or all of the features of the filtration system 300. In some embodiments, the skin or housing can include, one or more joined planar elements, whereas, in other embodiments, the skin or housing can include, for example, one or more joined non-planar elements. A person skilled in the art will recognize that the present disclosure is not limited to a specific shape or size of the skin or housing and that the design of the skin or housing can encompass a wide range of shapes, size, and features depending on the environment in which the filtration system 300 is placed.

Some embodiments of a water filtration system 300 include a raw water line that delivers raw water to the filtration unit (raw water line not shown in FIG. 3). In some preferred embodiments, the raw water line transports water from the raw water delivery system 200 to the water filtration system 300. The raw water line can include, for example, a hose. In preferred embodiments, the hose may be, for example, an insulated hose, the insulation shielding the raw water from extreme temperatures and exposure to light. In some preferred embodiments, the filtration system can receive water or fluid from a water delivery system as described above in connection with the raw water delivery system and FIGS. 2a and 2b. In further preferred embodiments, the insulation can be covered by protective layer to protect the insulation from exposure to sunlight. In other embodiments, the hose can be buried under a layer of earth to protect and insulate the hose and the raw water flowing through the hose. In some aspects of a buried hose, the hose can be covered by at least twelve inches of earth.

Figure 4:
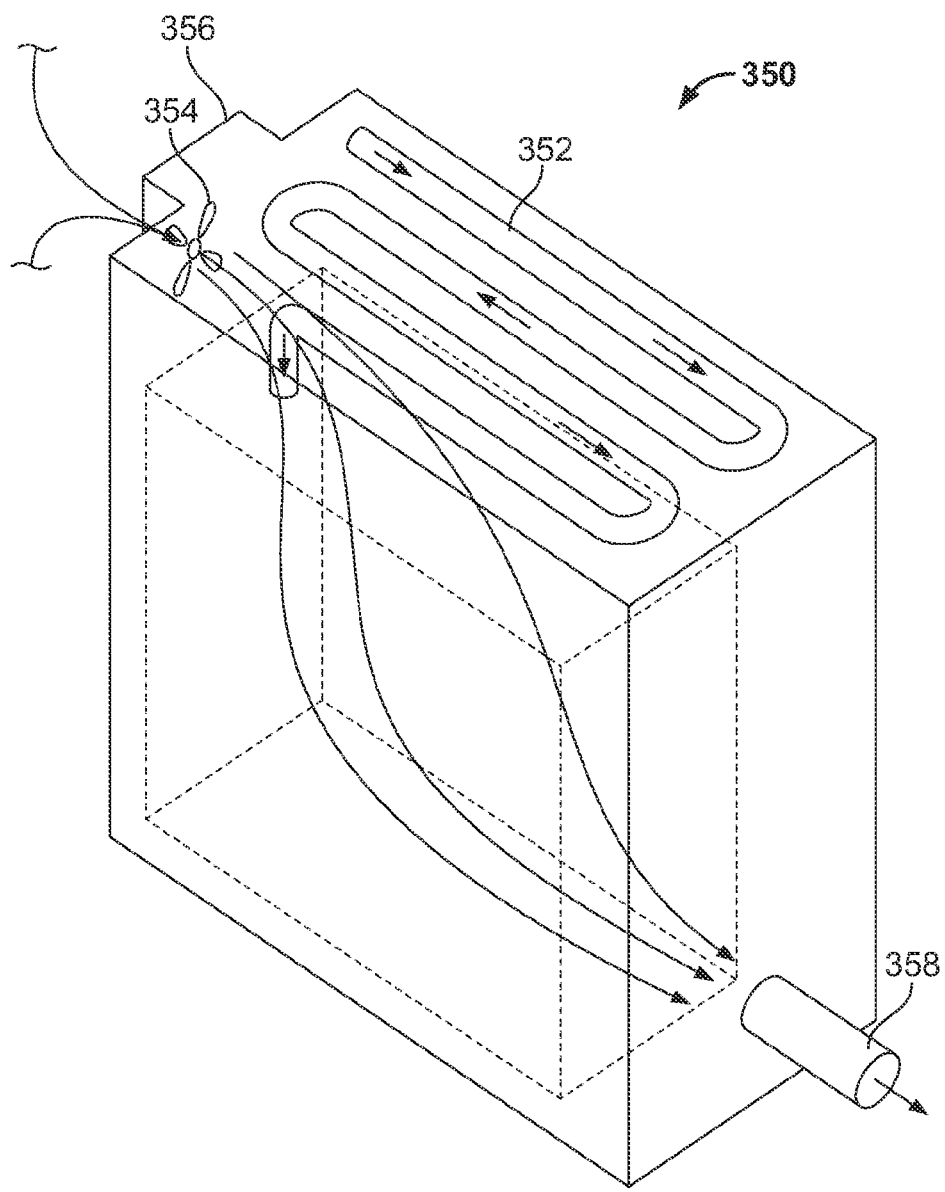
FIG. 4 is an example of a perspective view of an embodiment of a radiator.

Some embodiments of the housing of the water filtration system 300 can enclose several components in addition to the above discussed hydraulic components, including a charge controller, inverter, a pump disconnect, batteries, and wiring. Each of these components will be discussed in greater detail in relation to the electrical systems used in connection with the filtration system. However, these components, the filter membranes, and other components within the filtration system can be sensitive to temperatures inside and outside the housing. Some embodiments of a housing of a water filtration system include a radiator system to maintain temperatures in an ideal range within the housing of the filtration system. FIG. 4 depicts one embodiment of a radiator 350, which can include channels 352 for process liquid to pass through and features to encourage heat transfer between the housing and its contents and the process fluid. The channels 352 can further include inlet and outlet channels (not shown) to allow fluid to flow into and out of the channels 352 in the radiator 350. In some embodiments, the radiator system can include fins and a fan 354. In some preferred embodiments, the fan 354 can comprise a direct current (DC) fan. The fan 354 can be configured to assist in passing air over electronic components of the filtration system, thus facilitating the transfer of heat between the components and the air. The fan 354 can be further configured to assist in passing air over the radiator channels 352, thus facilitating the transfer of heat between the air and the radiator channels 352. The fan 354 can be configured to enter air into the radiator 350 through an air inlet 356, and after having passed the air over the channels 352, exit the air from the radiator 350 through an air outlet 358. Advantageously, inclusion of a radiator system 350 in a filtration system can assist in maintaining the ideal temperature of the components of the filtration system, and thus can increase the efficiency of those components.

In some embodiments, a water filtration system 300 may include a thermostat for monitoring heat and a radiator for dissipating heat. In some embodiments, a thermostat can be configured to maintain a temperature under approximately one-hundred ten degrees Fahrenheit, and in some embodiments ranging from eighty to one-hundred degrees Fahrenheit, or from eighty-five to ninety-five degrees Fahrenheit. In one preferred embodiment, raw water flowing to the water filtration system 300 flows through the radiator, thus absorbing excess filter heat, before beginning the purification process. Advantageously, running water through the radiator and absorbing the excess filter heat can assist in maintaining a preferred filter membrane temperature as well assist in maintaining a preferred water temperature. In other embodiments, raw water passing through the radiator can serve to increase the temperature of the filtration system to prevent freezing. Maintenance of temperatures in an ideal range can improve the versatility of the filtration unit in that the filtration unit can be used in more extreme temperature regions of the earth, and can improve the efficiency of the filtration unit as it has been surprisingly discovered that water filtration requires significantly less energy when both the filtered liquid and the membrane temperatures are within some preferred ranges. Some non-limiting examples of preferred temperature ranges include seventy-three to one-hundred six degrees Fahrenheit, from seventy-five to one-hundred degrees Fahrenheit, and from seventy-seven to ninety-five degrees Fahrenheit. A person skilled in the art will, however, recognize that the present disclosure is not limited to filtration systems including thermostats or radiators, or to systems in which the membrane and filtered liquid temperatures are maintained in an ideal range, but rather includes a broad range of filtration systems.

Preferred embodiments of a filtration system may include a controller. The controller can regulate the filtration system, controlling functions such as a filter backwash, UV light treatment, and receiving signals relating to water production needs. Advantageously, use of a filter backwash can facilitate cleaning of the filtering membranes, and thus can increase the efficiency of the filtration system.

However, when using some pumps, such as for example Grundfos® pumps, the implementation of the backwash can result in lost production time. In order to run the backwash, the pump may be temporarily shutdown. This pump stoppage can require pump restart procedures. In order to avoid lost production time, preferred embodiments of a filtration system of a solar powered filtration system 100 can include a pump bypass system linking the input fluid or raw water line to a drain line to prevent passage of fluid or water through the filtration unit 300.

Figure 5:
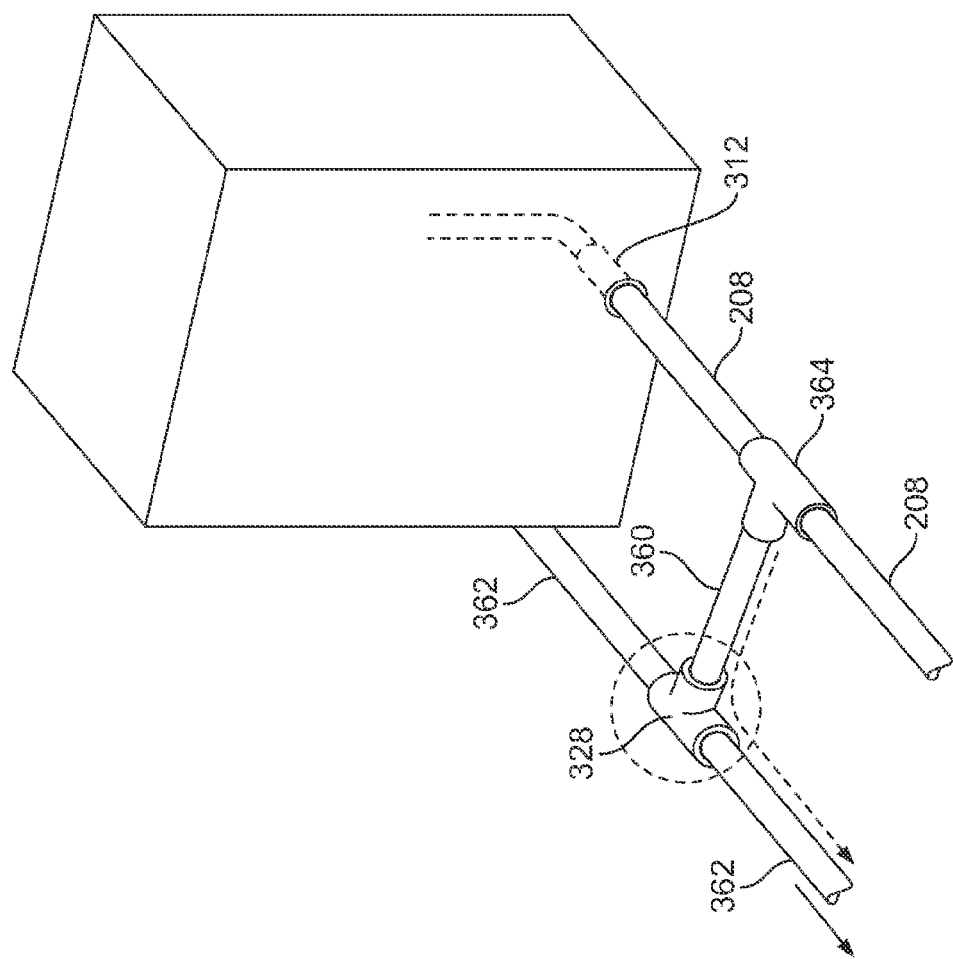
FIG. 5 is an example of a perspective view of one embodiment of a pump bypass system.

In preferred embodiments, and as shown in FIG. 5, a pump bypass system may include, for example, a solenoid valve 328 connected to the filtration system controller, a check valve 312, and a bypass line 360 connecting raw water line 208 to the drain line 362. In some embodiments, and as depicted in FIG. 3c, the drain line 362 may be the second drain line 310, whereas in other embodiments, the drain line 362 may be a combined first and second drain line 308, 310. In embodiments in which the drain line 362 is a combined first and second drain line 308, 310, the drain line 362 can hydraulically connect with hydraulic components of the filtration system 300 inside or outside of the housing.

Some embodiments of a pump bypass system may additionally include a solenoid valve 364 connected to the raw water line 208 and the bypass line 360. Surprisingly, embodiments of a filtration system that include a bypass system can experience higher efficiency than filtration systems without a bypass system. In some non-limiting embodiments, a system 300 that utilized a bypass system as illustrated resulted in up to fifteen percent greater water output compared to systems that did not utilize a bypass.

In some aspects, the controller can initiate a backwash by filling a pressure tank 324 with high pressure liquid. Once the pressure tank 324 is full, the controller signals the begin of the backwash, which signal opens the solenoid valve 328, allowing raw water to flow from the raw water line 208 through the bypass line 360, and out the drain line 362. Additionally, the check valve 312 which is located downstream of the bypass line 360 on the raw water line 208, can prevent further flow of raw water into the filtration system 300. In some additional embodiments, the bypass system may be controlled by a microprocessor in the controller.

Reverse Osmosis Purification System

Figure 6:
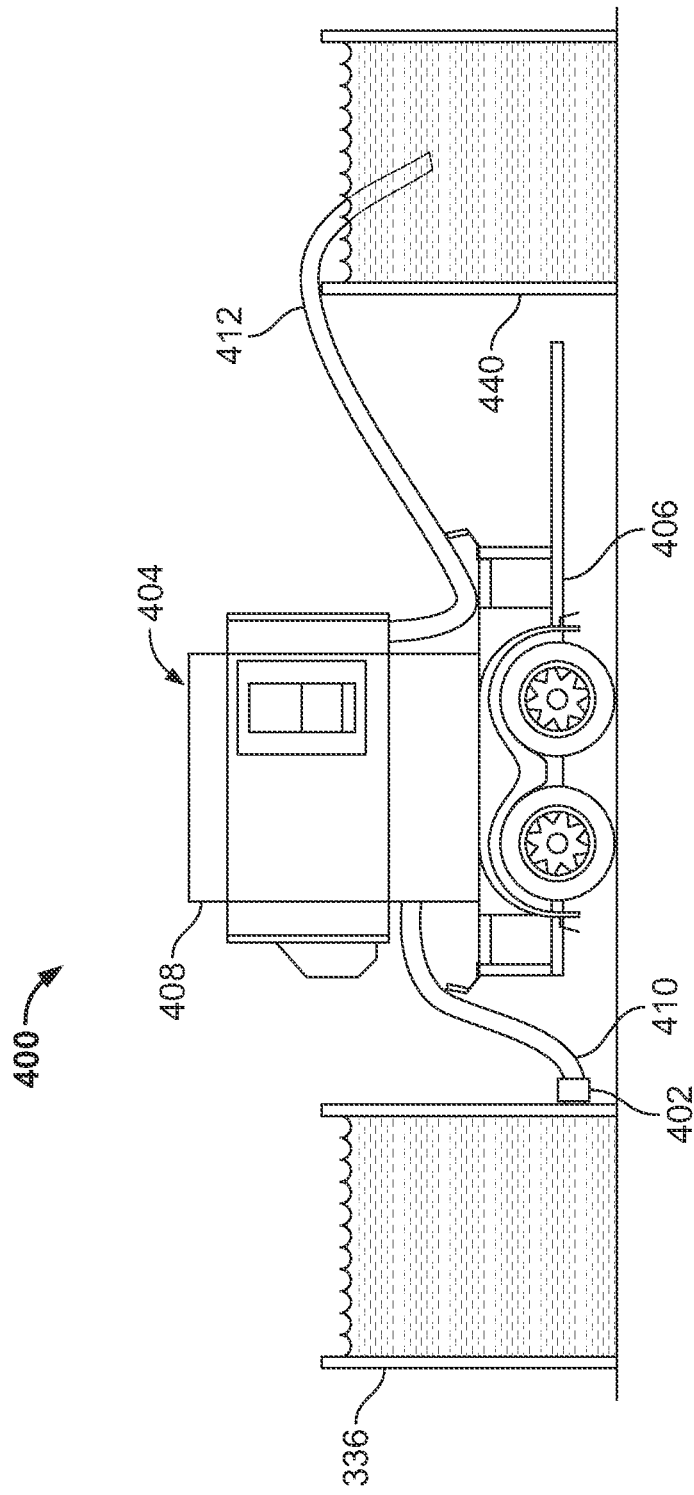
FIG. 6 an example of is a side-view of one embodiment of a reverse osmosis purification system.

FIG. 6 depicts one embodiment of a reverse osmosis purification system 400. In one embodiment of a reverse osmosis purification system 400, the system can include a pump 402, the pump further comprising a pump controller, and a reverse osmosis unit 404 comprising reverse osmosis membranes. In one embodiment, the reverse osmosis purification system 400 receives raw water (or other fluid) and processes it through reverse osmosis membranes. In other embodiments, the reverse osmosis purification system receives pre-filtered water (or other fluid) and processes the water through reverse osmosis membranes. In some preferred embodiments, the reverse osmosis purification system 400 can receive water that has been processed by an ultra-filtration system and then process that water through reverse osmosis membranes. For example, the reverse osmosis system 400 can received pre-filtered water or fluid from the filtration system described above (e.g., system 300) and elsewhere herein. A person skilled in the art will recognize that the present disclosure is not limited to the processing of water of any specific level of pre-filtration, but that the present disclosure includes processing of liquids of all levels of pre-filtration.

A person skilled in the art will further realize that the selection of the level of pre-filtration for water being processed by a reverse osmosis purification system in the design of a reverse osmosis system can depend on a variety of factors including the amount of power available, access to pre-filtration equipment, quality of the raw water, and available space.

As depicted in FIG. 6, in some embodiments, a reverse osmosis system can be mounted on a trailer 406 (or other mobile device such as a vehicle, etc.) and shielded by a housing 408. In other embodiments, the reverse osmosis unit 404 can be mounted on a platform, a foundation, or on the ground and include or exclude a housing 408. A person skilled in the art will recognize that the means of supporting the reverse osmosis unit 404 are not restricted to the specific embodiments disclosed in this specification.

As further depicted in FIG. 6, a reverse osmosis filtration system can comprise an inlet hose 410 and an outlet hose 412. The inlet house can be placed directly in a raw water source or it can be contacted with a pre-filtered source of water or fluid. In some embodiment of a reverse osmosis filtration system, the inlet house can be connected directly to a filtration unit, for example, a system as described herein (e.g., system 300). In other embodiments of a reverse osmosis filtration system, and as depicted in FIG. 6, the ultra-filtration unit discharges processed water into a storage tank 336 as discussed above. An inlet hose can be place in the storage tank 336 to enable the reverse osmosis filtration system to withdraw ultra-filtration system processed water from the storage tank for purification through the reverse osmosis filtration system. In the embodiment depicted in FIG. 6, the inlet hose 410 of the reverse osmosis filtration system can be attached to an opening in storage tank 336, for example as depicted, at the bottom portion of the storage tank 336. The outlet 412 as depicted discharges filtered fluid into receptacle 440.

FIG. 6 depicts one embodiment of a pump 402 for use in connection with a reverse osmosis purification system 400. A pump 402 can be located or mounted on or near the opening in the bottom portion of the storage tank 336 as depicted in FIG. 6. In other embodiments, the pump 402 can be located at various positions throughout the reverse osmosis purification system 400.

In some embodiments, a pump 402 configured for use in connection with a reverse osmosis purification system 400 can be configured for generation of sufficient pressure to process a predetermined volume of liquid. In some embodiments, without being limited thereto, a pump can be configured to provide generation of between one-tenth of a gallon per minute and one thousand five hundred gallons per minute. In some non-limiting embodiments of a reverse osmosis purification system 400, the pressure for generation of an adequate volume of liquid can range from approximately 25-500 pounds per square inch (psi), or greater, these pressures depending on the hydraulic resistance of the reverse osmosis membranes and purification system. A person skilled in the art will recognize that the scope of the present disclosure is not limited to purification systems operation at pressures between 25-500 psi, but includes all operating pressures.

A pump 402 can be created using a variety of techniques known in the art, construction of the pump 402 and pump type selection being constrained by price, size, weight, power consumption, and pressure requirements. In one preferred embodiment depicted in FIG. 6, a pump 402 can comprise a helical rotary pump. A person skilled in the art will recognize that the present disclosure is not limited to helical rotor pumps, but includes a broad range of pump types.

Referring to FIG. 7a, one embodiment of a helical rotor pump 420 can include a housing 422, a drive shaft 424, a rotating helical pump member 426, a mating fixed pump member 428, and a motor 430.

In one embodiment of a helical rotor pump 420, the housing 422 includes shroud 432. As used herein, "shroud" refers to a partial or complete covering of a pump housing 422. In some aspects, as partial shroud can cover, for example, 10 percent to approximately 99 percent of the pump 420 or pump housing 422. In some aspects the shroud is a partial or complete covering that helps maintain a desired temperature for the pump by, for example, heating, cooling, or insulation. For example, the shroud can be a partial or complete covering that cools the pump. The shroud 432 can comprise a variety of configurations in a variety of dimensions and shapes, and of a variety of materials. In one embodiment, and as depicted in FIG. 7b, the shroud 432 can be configured to radially extend from the outer circumferential side-walls of the mating fixed pump member 428 and to longitudinally extend along, and beyond the outer circumferential side-walls of the mating fixed pump member 428. The use of a shroud can provide improved efficiency by maintaining the pump at a desired temperature, for example as disclosed elsewhere herein. In some embodiments, a shroud can be made of metal, composite, polymer, fabric, wood, rock, or any other material, natural or man-made.

Additionally, some embodiments include the use of a shroud 432 that defines or includes channels 434 for fluid flow. It should be noted that in some embodiments the pump 420 can include channels 434 for fluid flow without a shroud. For examples, the channels can be in the form of closed tubes or pipes that contact the pump 420 at one or more locations, for example, as illustrated in the FIG. 7b (but without the shroud) and as described below. In some embodiments of channels 434, the channels 434 can be configured to receive water that has already passed through the pump or water that has not yet passed through the pump. In other embodiments of the shroud 432, the channels 434 can be connected to a cooling system and configured to receive coolant from the cooling system and to return heated coolant back to the cooling system. A person skilled in the art will recognize that the present disclosure is not limited to application with helical rotor pumps or to specific liquids flowing through the pump or the shroud.

Embodiments of a pump 420 and/or a shroud 432 comprising channels 434 can have or include a variety of channel configurations and channel paths. In some embodiments of a channel 434, the channel 434 can pass over all or selected portions of the outer circumferential side-walls of the mating fixed pump member 428 once or several times. Advantageously, the different embodiments of the channel 434 can provide varying degrees of pump cooling and fluid heating. Selection of a specific desired channel configuration thus can include evaluation of fluid heat and/or pump cooling needs, size, weight, and cost constraints. The use of the channels 434 with or without the shroud can provide improved pump efficiency and can provide energy transfer to and from the fluid.

Further embodiments of a shroud 432 comprising channels 434 can include the use of material or structural features to increase structural strength or heat transfer between the pump and the working fluid. Thus, some embodiments may include the use of materials readily adapted to the transfer of heat from the pump to the working fluid. Additionally, some embodiments can include structural features to improve heat transfer such as fins, posts, or specific surface finishes. Additionally, some embodiments of a shroud 432 comprising channels 434 can include features to create a desired rigidity, strength, or weight of the shroud 432 and pump. These structural features can be advantageously combined with heat transfer features to maximize pump efficiency. Thus, in some embodiments, fins, posts, or other heat transfer features can alter structural features of the shroud 432. A person skilled in the art will realize that the selection of the shroud 432 and pump material, as well as the design for strength and heat transfer, are not limited by the specific disclosures of this specification.

In the embodiment depicted in FIG. 7b the shroud 432 defines a channel 434 completely circumferentially encompassing the mating fixed pump member 428. In the particular embodiment depicted in FIG. 7b, the channel 434 of the shroud 432 passes twice over the outer circumferential sidewalls of the mating fixed pump member 428 before the fluid enters into the pump 420.

Advantageously, embodiments of a pump 420 comprising a shroud 432 with channels 434 can be configured to maintain an ideal working temperature for the pump 420 as well as to contribute in heating the working fluid to an ideal temperature for purification processes. In some embodiments of a pump 420 comprising a shroud 432 with channels 434, as depicted in FIG. 7b, temperature of a working fluid can be increased by between two and fifteen degrees Fahrenheit as determined by measuring temperature of water flowing to the pump/shroud and water flowing from the pump/shroud. Additionally, in embodiments of a pump 420 comprising a shroud 432 with channels 434, as depicted in FIG. 7b, the temperature of the pump 420 can be decreased by ten to sixty degrees Fahrenheit as compared to a similar pump without such a shroud 432 with channels 434. Additionally, in embodiments of a pump 420 comprising a shroud 432 with channels 434, as depicted in FIG. 7b, a helical rotor pump 420 running at one-thousand eight-hundred to three-thousand six-hundred revolutions per minute (rpm) and pumping fluid at flow rates of one-tenth to one-thousand five-hundred gallons per minute can be maintained at a temperature under one-hundred six degrees Fahrenheit and in some embodiments ranging from forty-five to one-hundred degrees Fahrenheit or from seventy-seven to ninety-five degrees Fahrenheit. A person skilled in the art will recognize that the present disclosure is not limited to pumps running at a specific rpm, pump flow at a specific flow rate, or maintaining a temperature within a specific range.

Surprisingly, embodiments of a pump 420 comprising a shroud 432 and/or channels 434 can synergistically improve the efficiency of a reverse osmosis purification system 400 and thus decrease the amount of energy required to process fluid by increasing pump efficiency and decreasing hydraulic resistance. Increasing the temperature of the working fluid decreases the amount of hydraulic resistance in the membranes. This decrease in hydraulic resistance in the membrane decreases the pressure required to process fluid, thus decreasing the pressure output requirements for the pump 420. Simultaneously, the cooling of the pump 420 by transferring heat from the pump 420 to the working fluid increases the efficiency of the pump 420. This results in the pump 420 consuming less power in pressurizing the reverse osmosis purification system for processing fluid. Thus, a pump 420 comprising a shroud 432 with channels 434 increases processing efficiency by decreasing the pressure requirements for fluid processing while also increasing pumping efficiency.

Advantageously, a pump 420 comprising a shroud 432 can be used in a variety of applications other than in connection with a reverse osmosis purification system 400. In some embodiments, a pump 420 comprising a shroud 432 can be used, for example, for pumping liquid, such water, into a water tower; pumping liquid from one point to another; pumping liquid through a pipe-line; or for pumping liquid from one elevation to another. Advantageously, in some aspects a shroud, such as shroud 432, can cool the pump and increases pump efficiency, enabling the pump to be run at a higher speed without over-heating the pump. In some embodiments, the use of such shrouded pumps can permit pumps that normally are temperature limited to speeds between seven-hundred fifty to one-thousand seven-hundred fifty revolutions per minute (rpm) to run at speeds of, for example, one-thousand eight-hundred to three-thousand six-hundred revolutions per minute (rpm). This can decrease the size and number of pumps required in the pumping application.

Some embodiments of a reverse osmosis filtration system can include a pump controller to control the pump. A pump controller can receive signals, for example, relating to availability of water for processing, the need for processed water, and power available to the purification system, and control the pump in view of these signals. In one embodiment, a signal indicating a need for processed water could lead the pump controller to signal the pump to pump water through the reverse osmosis filtration system. In some embodiments, a pump controller can further comprise features to enable heat transfer from the pump controller to process liquid, including channels for the process liquid and structural features to encourage heat transfer.

Figure 8:
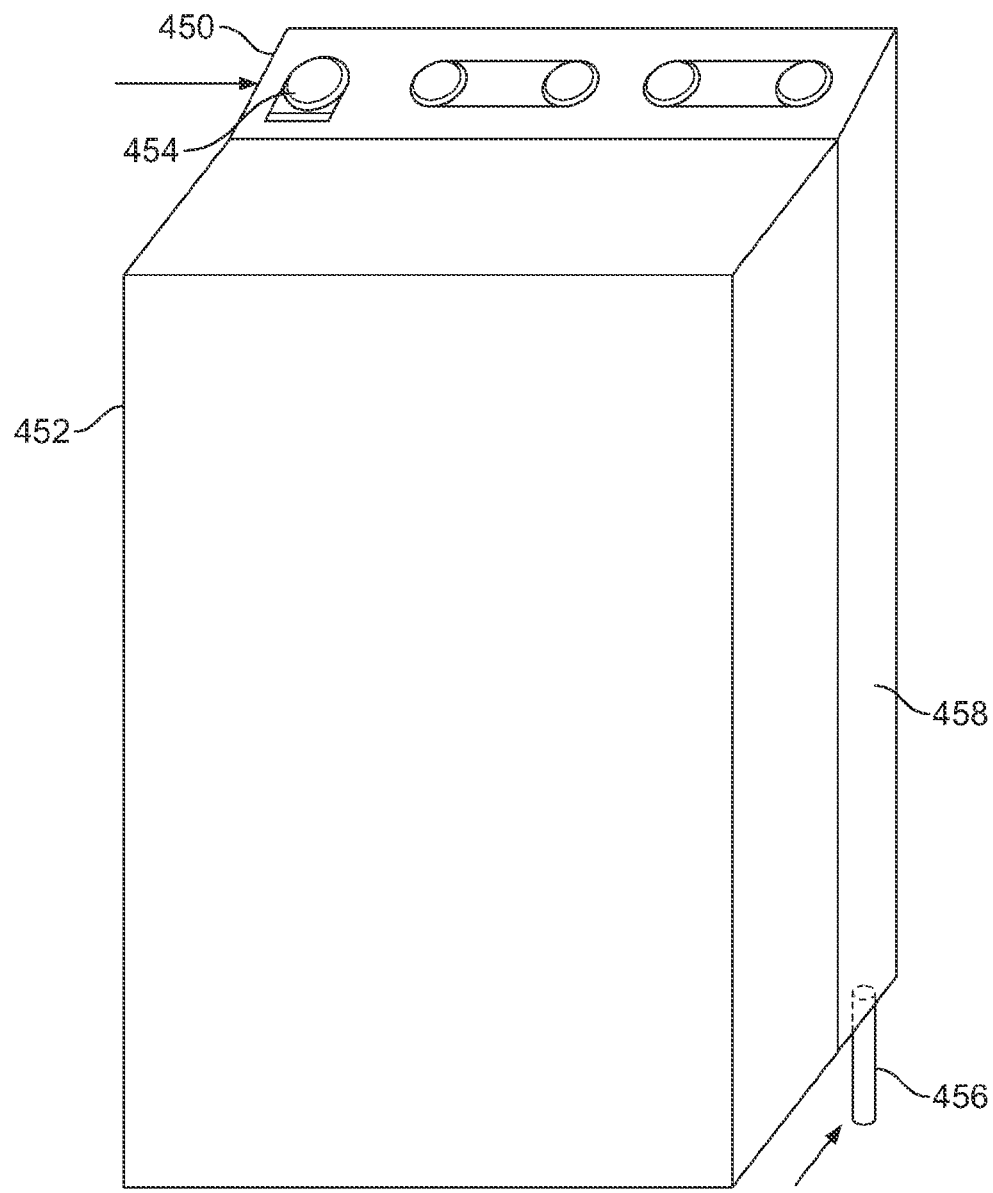
FIG. 8 is an example of a schematic of one embodiment of a pump controller system with cooling device.

As depicted in FIG. 8, an example of one embodiment of a liquid cooler 450 configured to transfer heat from a pump controller 452 to process liquid, a liquid cooler 450 can include an inlet pipe 454 and an outlet pipe 456. In the embodiment depicted in FIG. 8, the inlet pipe 454 directs process liquid into radiator 458 comprising thermal conductive material. A person skilled in the art will recognize that a radiator can include a variety of channels, pipes, or other features configured for fluid flow through the radiator 458. In some embodiments, the channels, pipes, or other features configured for fluid flow can be configured for desired process fluid flow rate, desired heat transfer rate, desired cooled temperature change, or desired temperature change of the process fluid. After passing through the channels, pipes, or other fluid flow features, the fluid can exit the radiator 458 through the outlet pipe 456. A person skilled in the art will recognize that the present disclosure is not limited to any specific pipe, channel, or fluid flow features. Advantageously, embodiments of a heat controller including features to transfer heat from the pump controller to the process fluid can further assist in raising the temperature of the process liquid to an ideal range, while simultaneously decreasing the temperature, and thus increasing the efficiency, of the pump controller. A person skilled in the art will further recognize that other sources of heat can also be utilized in connection with process fluid to simultaneously cool the heat generating component and to heat the process fluid.

Referring again to FIG. 6, a reverse osmosis filtration system can, in some embodiments, deliver purified processed water directly to users. For example, in some aspects, the reverse osmosis system can deliver the treated water or other fluid into a plurality of storage containers having any desired size. For example, the containers can range in size from one pint, one liter, two liters, one gallon, 10 gallons, 20 gallons, 50 gallons or more for example. In other embodiments of a reverse osmosis purification system, purified processed water can be discharged to a storage receptacle 440. A person skilled in the art will recognize that a variety of natural and manmade containers can be used as a storage receptacle 440 and that the present disclosure is not limited to use of a specific form of container as a storage receptacle 440. In some embodiments of a reverse osmosis filtration system 400 in which processed water is stored in a storage receptacle 440, a float system can communicate water levels in the storage receptacle 440 to a controller. A controller can then, based on signals received from the float system in the storage receptacle 440, start or stop the pumping and processing of water through the reverse osmosis filtration system 400

In further embodiments of a reverse osmosis filtration system 400, the reverse osmosis filtration system 400 can be connected to a first float located in the ultra-filtration system storage tank 336 and a second float located in the reverse osmosis filtration system storage receptacle 440. The first float comprises a low-level float, sending a signal to the reverse osmosis filtration system 400 when the fluid level in the storage tank 336 drops below a pre-specified level. The second float comprises a high-level float, sending a signal to the reverse osmosis filtration system 400 when the fluid level in the storage receptacle 440 exceeds a pre-specified level. It should be appreciated that the use of one or more floats is not meant to be limiting. Other configurations can be utilized which provide a signal to the reverse osmosis system 400 indicating the level of the input or output sources.

Some embodiments of a reverse osmosis filtration system further comprise a solar exterior radiator. A solar exterior radiator can comprise an inlet port for allowing process water to flow into the radiator and an outlet port to allow water to flow out of the radiator. The solar exterior radiator can also comprise channels connecting the inlet port to the outlet port. A person skilled in the art will recognize that the dimensions of the channels are dependent on the desired flow rate of process water through the solar exterior radiator and the desired degree of heat transfer from the radiator to the water. A solar exterior radiator can further comprise features to assist in the transfer of energy and heat to the process water. In some embodiments, a solar exterior radiator can comprise features configured to use solar energy to heat water. These can include water-heating solar panels, black paint on the radiator, or a combination of mechanical features configured to absorb heat. Some embodiments of a solar exterior radiator can further include a thermostat and other features to maintain a temperature of process liquid exiting the radiator in a desired range, including, for example a fan. In some embodiments fluid exiting the solar exterior radiator can include fluid temperatures ranging from seventy-three to one-hundred six degrees Fahrenheit, from seventy-five to one-hundred degrees Fahrenheit, and from seventy-seven to ninety-five degrees Fahrenheit. A person skilled in the art will, however, realize that the scope of a solar exterior radiator is not limited to the method of transferring heat and energy to the water.

The use of a solar exterior radiator can further assist in maintaining an ideal temperature of process liquid to increase the efficiency of the reverse osmosis purification process.

Some embodiments of a reverse osmosis filtration system can comprise an interior cabinet radiator. An interior cabinet radiator can comprise an inlet port for allowing process water to flow into the radiator and an outlet port to allow water to flow out of the radiator. The interior cabinet radiator can also comprise channels connecting the inlet port to the outlet port. A person skilled in the art will recognize that the dimensions of the channels are dependent on the desired through flow rate of process water through the interior cabinet radiator and the desired degree of heat transfer from the process fluid to the radiator. An interior cabinet radiator can further comprise structural features configured to improve heat transfer from process water to the interior cabinet radiator, including, for example, fins, posts, or other surface area increasing features. An interior cabinet radiator can further comprise features to control the degree of heat transfer from the process fluid to the radiator and from the radiator to the inside of the cabinet of the reverse osmosis filtration system, including, for example, a fan. An interior cabinet radiator can, in some embodiments, be used in a connection with a thermostat, the thermostat assisting in maintaining an ideal water and cabinet interior temperature, the thermostat can, for example, be set to maintain a temperature under ninety degrees Fahrenheit.

An interior cabinet radiator can assist in maintaining a preferred cabinet temperature. In some embodiments the cabinet temperature can be maintained above freezing and in some further embodiments, cabinet temperature can be maintained in a range from seventy to one-hundred ten degrees Fahrenheit, from eighty to one-hundred degrees Fahrenheit, and from eighty-five to ninety-five degrees Fahrenheit. Embodiments including an interior cabinet radiator advantageously enable use of the reverse osmosis filtration system in a greater variety of climate extremes, for example, use of an interior cabinet radiator can assist in preventing the freezing of components of the reverse osmosis filtration system in cold temperatures. Additionally, an interior cabinet radiator can further assist in maintaining preferred membrane temperature as well as ideal temperature for all other components of the cabinet, thus increasing the efficiency of the reverse osmosis filtration system. In some embodiments, a preferred membrane temperature can include temperatures ranging from seventy-three to one-hundred six degrees Fahrenheit, from seventy-five to one-hundred degrees Fahrenheit, and from seventy-seven to ninety-five degrees Fahrenheit, and an ideal component temperature range can include temperatures ranging from approximately thirty-five to one-hundred degrees Fahrenheit.

In some embodiments of a reverse osmosis filtration system 400, water pre-filtered by the ultra-filtration system is contained in a storage tank 336. A pump 402 pumps the process water from the storage tank 336. The water travels through a heat transfer shroud 432 surrounding the pump 402, and then travels through the pump 402, increasing the temperature of the water and simultaneous cooling the pump 402. The water exits the pump 402, warmed and pressurized to the desired pressure. The water then travels through heat transfer features associated with a pump controller, cooling the pump controller and simultaneously warming the water. The water then passes to the solar exterior radiator, where the water temperature is further raised, and then to the interior cabinet radiator where heat from the water is transferred to the cabinet of the reverse osmosis filtration system 400. The water is then brought into contact with the reverse osmosis membranes. A portion of the water diffuses through the reverse osmosis membranes and can be discharged from the reverse osmosis filtration system into a storage receptacle. A portion of the water that does not diffuse through the reverse osmosis membranes can be rejected and discharged from the reverse osmosis filtration system. This rejected, discharged water can contain higher concentrations of impurities and may not be suitable for consumption. A person skilled in the art will appreciate that the path of water may include additional or fewer components than those described above or components arranged in a different order than those described above. For example, in some embodiments one or more of the shrouded pump, the heat transfer features associated with the pump controller, the solar radiator, can be specifically excluded or reordered.

Some embodiments of a reverse osmosis purification system may include a system controller. The system can control aspects of the reverse osmosis purification sub-system. In some embodiments, the controller can be shared with other subsystems of the reverse osmosis system, including for example the filtration sub-system, the water supply sub-system, or the solar energy sub-system. The controller can control functions of the reverse osmosis system such as, for example, backwash, chemical purification treatment, lighting control, power management and receiving signals relating to water production needs. These functions can increase the efficiency of the filtration system as well as provide other benefits.

In some embodiments the controller can be configured to determine a minimum amount of pressure required to properly run the reverse osmosis system. In some embodiments, the controller may be configured to determine the amount of pressure required to properly purify water with a reverse osmosis purification system. A person skilled in the art will recognize that this minimum pressure is system dependent and is usually determined on a system by system basis comparing output water to water purification or filtration standards such as the World Health Organization standard for Total Dissolved Solids.

A controller can be additionally configured to measure the amount of solar insolation and therewith determine whether immediate power production is sufficient to achieve a minimum pressure for proper liquid purification. The controller can be configured to request and receive information from an insolation sensor. In some embodiments, the controller can continuously request and receive this information from the insolation sensor. In other embodiments, the controller can request and receive this information at predetermined intervals. In some embodiments, the controller can determine the amount of energy that will be produced by the solar power system with the measured level of insolation. In some embodiments in which an insufficient amount of solar insolation is present to maintain a minimum pressure a controller can be configured to stop water production before water quality diminishes. In some alternative embodiments, the controller can also adjust liquid purification rates to maximize usage of available insolation. In some additional embodiments, a controller may be connected to a sensor capable of determining the purification level of the processed liquid. In some embodiments, a controller can be configured to take remedial action upon detection of processed liquid that fails to meet the desired purification level. Remedial action can include, in some embodiments, action such as notifying a system operator of the water condition, or backwashing or chemically treating the reverse osmosis system or component sub-systems.

In some embodiments, the controller can initiate circulation of a descalant through the reverse osmosis purification system to remove mineral and other deposits. In some embodiments, the descalant can be circulated at times when solar power is minimal, such as around sunrise or sunset.

Solar Energy System

Embodiments of a solar powered reverse osmosis system 100 can require electricity to power the sub-systems of the reverse osmosis system. While solar power is specifically mentioned herein, it should be noted that in some embodiments, power can be supplied by other sources, both renewable and non-renewable. For example, instead of or in addition to solar power, the power can come from one or more of a power grid, batteries, or from electricity generation. A person skilled in the art will recognize that a wide variety of sources of power can be used in connection with a reverse osmosis system 100 or any of its components and that the present disclosure is not limited to one specific source of electric power. Similarly, a person of skill in the art will recognize that while the present disclosure refers to some embodiments of components within the reverse osmosis system 100 using alternating or direct current, the present disclosure includes varying the type of current used to power the components of the reverse osmosis system 100. Thus, in some embodiments, the system 100 can exclude the solar power features or include additional power features along with the solar power.

In some preferred embodiments, power can be supplied from a combination of photovoltaic solar panels and batteries. More specifically, in some embodiments of a solar powered reverse osmosis system 100, some sub-systems operate using power received directly from some solar panels and other sub-systems operate using transformed power received from some solar panels. A person skilled in the art will recognize that the source of power for different subsystems can be based on a variety of factors including the specific power needs of each subsystem, the ability of the solar panels to generate needed power, and cost considerations.

In some preferred embodiments, pump systems are powered by direct current received straight from the solar panels, and filtration sub-systems are powered by alternating current generated by the solar panels, and transformed before use by the filtration subsystems.

Referring to FIG. 1, a solar energy system 500 generates electricity for operating the solar powered filtration system 100. As depicted in FIG. 1, the solar energy system may include, for example, at least one solar panel 502 and a base 504. The solar system 500 may include, for example, a variety of types of electricity generating panels 502. In preferred embodiments the solar energy system may include a plurality of solar panels 502. In one preferred embodiment, a solar energy system can include, for example, six solar panels 502, three panels 502 designated for generating electricity for the filtration units and three panels 502 designated for generating electricity for the pump units 218, 402. In other preferred embodiments, a solar energy system can include, for example, nine solar panels 502, three panels 502 designated for generating electricity for the filtration system and six panels 502 designated for generating electricity for the pump units 218, 402. Additionally, combinations of multiple arrays can be used in some embodiments to power a reverse osmosis system 100. A person skilled in the art will recognize that the amount of solar power generation capacity required depends on a variety of factors such a component power consumption and processing rate requirements and that the present disclosure does not limit reverse osmosis filtration systems to any specific number of solar panels.

In some non-limiting aspects, these solar panels 502 can be 175 watt panels. More specifically, in some preferred embodiments, solar panels 502 generating electricity for the filtration systems can be connected in parallel, and solar panels 502 generating electricity for the pump units 218, 402 can be connected in series. Thus, in some embodiments between 525 and 2100 watts of electricity can be provided to the pump units 218, 402. A person skilled in the art will recognize that the distribution of power generated by panels 502 to the pump units 218, 402 and the filtration systems can vary depending on the specific power needs of the pump units 218, 402 and/or the filtration systems. A person skilled in the art will further recognize in view of this disclosure that a variety of techniques can be used in connecting panels 502 to each other and to their powered sub-systems and that the scope of the present disclosure is not limited to a specific method of connection.

Figure 9:
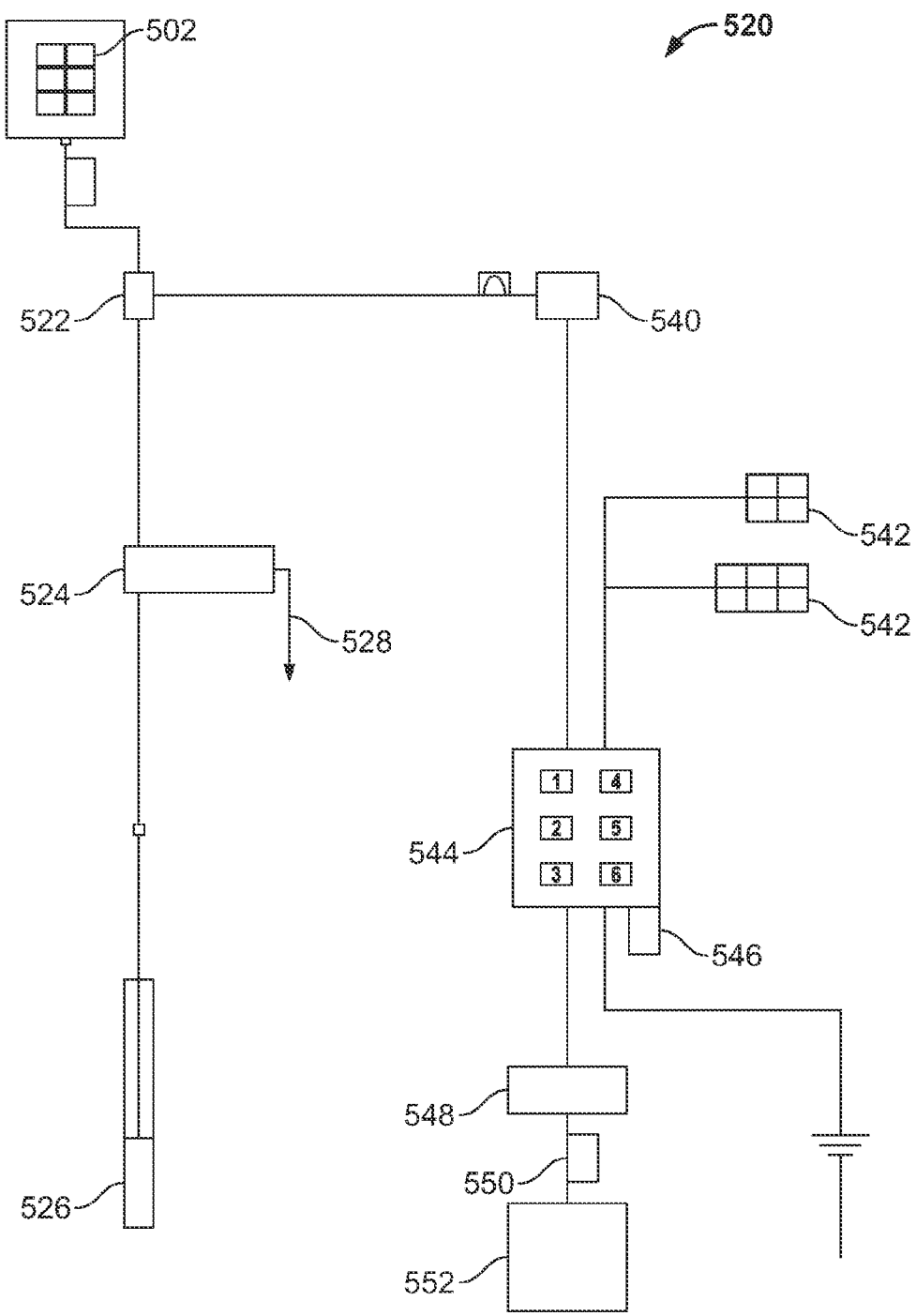
FIG. 9 is an example of a schematic of one layout of an electrical control system.

Some preferred embodiments of a power system 520 for powering the pump units 218, 402 are depicted in FIG. 9. FIG. 9 depicts a power system 520 for supplying power to pump units, for example pump units 218 and 402 described elsewhere herein, the power system 520 comprising at least one solar panel 502. In embodiments in which more than one solar panel 502 is used to supply power to the pump units, the solar panels 502 can be connected to each other and to the system using any technique known in the art. In preferred embodiments of a power system 520, a plurality of solar panels 502 can be connected in series. In one preferred embodiment in which solar panels 502 are connected in series, the panels 502 supply between approximately fifty and three-hundred volts DC and one-hundred seventy-five to two-thousand one-hundred watts. A person skilled in the art will however recognize that a power system 520 for powering pump units 218, 402 is not limited to solar panels 502 connected in series, but that the present disclosure includes all modes of connection of solar panels 502.

Some preferred embodiments of a power system 520 can further comprise square D breaker 522, the breaker 522 providing a kill switch for the pump unit sub-system, a pump controller 524, and a pump 526. In such an embodiment, power can flow from the solar panel 502, through the breaker 522 to the pump controller 524. The pump controller 524 regulates the amount of power sent to and the desired output from the pump 526. In some embodiments, a pump controller 524 can power the pump 526 when the pump controller 524 receives between fifty and two-hundred thirty volts DC and one-hundred seventy-five to two-thousand one-hundred watts from the at least one solar panel 502. In some additional embodiments, the pump controller 524 can be connected to floats (or other signaling devices) 528 located in a storage tank (e.g., tank 336) or in a storage receptacle (e.g., receptacle 440). In these embodiments, the pump controller 524 receives the signal relating to needs of processed water and supply of water for processing directly from the float/signal system as opposed to from the filtration controller. The pump controller 524 interprets these received signals and controls the pump 526 in light of water needs and water availability. Thus, the power directed to the pump 526, passes through the controller 524 and powers the pump 526.

Surprisingly, providing direct power to a pump sub-system from at least one solar panel 502 can increase efficiency of the pump sub-system by up to between twenty-five and forty percent as compared to power systems in which power is not directly supplied to the pump sub-system. This increased efficiency can enable consumption of less power while processing the same volume of liquid. This enables the use of less power and fewer power generation resources, which in turn can permit the creation of a more compact and lighter weight system.

As shown in FIG. 9, a power supply system 520 for powering a filtration system can comprise at least one solar panel 502. This solar panel can be the same panel supplying power to the pump units (e.g., pump units 218, 402 described herein), or can be separate from the panel 502 supplying power to the pump units. In some embodiments, the solar panel 502 can comprise an array of connected panels 502. In some preferred embodiments of a power supply system for a filtration system, solar panels can provide power from twenty-four to one-thousand volts DC and fifty to thirty-thousand watts. In embodiments in which more than one solar panel is used to supply power to the pump system, the solar panels can be connected to each other and to the system using any technique known in the art. In preferred embodiments of a power system for a filtration system, a plurality of solar panels can be connected in parallel. In one preferred embodiment in which solar panels are connected in parallel, the panels supply 24 volts DC and between one-hundred seventy-five to two-thousand one-hundred watts. A person skilled in the art will however recognize that a power system 520 for providing power to a filtration system is not limited to solar panels 502 connected in series, but that the present disclosure includes all modes of connection of solar panels 502.

Some preferred embodiments of a power system 520 for a filtration system can further comprise one or more square D breakers 522, the breaker 522 providing a kill switch for the filtration sub-system. A power system for a filtration system can further comprise, for example, a charge controller 540, at least one battery 542, a circuit breaker panel 544, at least one lightning arrestor 546, an inverter 548, at least one surge protector 550, and a microprocessor 552. A charge controller 540 can be included in a power system 520 to facilitate the charging of batteries 542 by regulating the rate at which charge is added to or taken from the batteries 542. Advantageously, use of a charge controller 540 increases the efficiency with which batteries 542 can be recharged and increases the life of the batteries 542.

A battery 542 can be included in a power system 520 for a filtration system to power elements of the filtration system after the solar panel 502 has stopped generating electricity. In some embodiments, the batteries 542 can be configured to only supply power to components relating to the filtration system, whereas, in other embodiments, the batteries 542 can be configured to supply power to any component in the reverse osmosis filtration system 100. In some embodiments of a power system 520, two sets of batteries 542 can be used, including a set of four, twelve volt batteries 542, series-parallel wired to output power at twenty-four volts, and a set of six, twelve volt batteries 542, similarly series-parallel wired to output power at twenty-four volts. A person skilled in the art will recognize that the present disclosure is not limited to a specific number of batteries 542, the specific voltage of batteries, or to the specific form of wiring between the batteries 542 and the power supply system 520.

Some embodiments of a power system 520 can further include a circuit breaker panel 546. Similar to the function of the square D breaker 522, the circuit breakers in the circuit breaker panel 546 can provide a kill switch to different components of the filtration system. Additionally, the circuit breakers can function to limit the current flowing to each of the components of the filtration system. In some preferred embodiments of a power system 520 for a filtration system, a circuit breaker panel 546 can comprise six circuit breakers. In some embodiments, circuit breakers can be assigned to, for example, the charge controller 540, the at least one battery 542, a vent fan, the inverter, the at least one lightning arrestor 546, and to an open circuit. A person skilled in the art will recognize that the scope of the present invention is not limited to the above listed connections of components to circuit breakers, but that the scope of the present disclosure includes a broad variety of components connected to circuit breakers.

Some embodiments of a power supply system 520 for a filtration system can further comprise a lightning arrestor 546 and/or a surge protector 550. In some embodiments, a lighting arrestor 546 and/or a surge protector 550 can protect wiring and electrical components from the harmful effects of a power surge. A person skilled in the art will recognize that the scope of the present disclosure is not limited to use of at least one lightning arrestor 546 and/or surge protector 550, but that the scope may include a power supply system 520 with a wide variety of features, or absence thereof, to diminish harmful effects of a power surge.

Some embodiments of a power supply system 520 for a filtration system can further comprise an inverter 548. An inverter 548 can be used from converting direct current into alternating current. In some embodiments of a power supply system, available electricity can be in direct current. In these embodiments, an inverter 548 is advantageously included in the power supply system 520 to convert direct current into alternating current so that the electricity may be used by AC components of the filtration system. A person skilled in the art will, however, recognize that the scope of the present disclosure is not limited to embodiments comprising an inverter 548, but rather realize that the decision to include or exclude an inverter 548 in a power supply system 520 is based on a variety of considerations, including, for example, form of available power and power needs of components of the subsystems.

Some embodiments of a power supply system 520 can further comprise a microprocessor 552 associated with the filtration system. As discussed above in the context of the filtration systems, a microprocessor can control the functions of the filtration system, including filtering, lighting, temperature control, back flush and/or system purge, and processing rate. A person skilled in the art will recognize that the present disclosure of a microcontroller 552 is not limited to the above discussed controlled components, but that a microcontroller 552 can be used to control a variety of components and subsystems relating to a filtration unit.

In some embodiments of a power supply system 520 for a filtration system, power is generated by solar panels 502 and travels through the square D breaker 522. After passing the square D breaker 522, the power passes to a charge controller 540 where the current flow is regulated. Electric current can flow to a circuit breaker panel 544, from which the electric current can travel to a variety of components of a filtration system. In some embodiments, electric current from a circuit breaker panel 544 passes to an inverter 548, where electricity is converted from DC into AC. The electricity then passes to a microprocessor 552 which can control components of the filtration system. A person skilled in the art will, however, recognize that current can be routed through a broad range of components and subsystems in a power supply system as desired by the system designer.

Referring again to FIG. 1, preferred embodiments of a base 504 include a mobile tracker base. A mobile tracker base can increase solar panel efficiency, by up to approximately forty to fifty percent, by tracking movement of the sun throughout the day and thus constantly directing the solar panels at the sun. Some embodiments of a tracker base include active tracker bases, chronological tracker bases, and passive tracker bases. Preferred embodiments of a mobile tracker base comprise a passive tracker base.

One embodiment of a passive tracker base comprises two chambers, gas filling the chambers, connections between the chambers, and reflectors for directing sunlight onto the chambers. In this embodiment, sun light is differentially reflected onto the chambers by the reflectors depending on the angle defined between the base and the sun. As the sun moves, and this relative angle changes, one of the chambers receives more sunlight, and thus achieves a higher temperature. This temperature difference between the chambers drives gas from one chamber to the other, resulting in a weight differential between the chambers. This weight differential results in the movement of the tracker base. Some aspects can include "shadow plates" that differentially shade or block light from one or more of the chambers. The light that can be differentially shaded from the chambers by the shadow plates depending upon the angle defined between the base and the sun.

Preferred embodiments of passive trackers additionally may include a controlled heating device position on the chambers. The heating device control may be configured so that the heating device creates a temperature differential in the chambers before sun rise, the temperature differential resulting in the pre-orientation of the tracker base towards the position of the sunrise. The heater can receive energy for heating from a variety of sources including from batteries, from a power grid, or from any other energy source. In preferred embodiments, the heating device may include a forty watt silicon heater. In further preferred embodiments, the heating device control includes an astronomical timer comprising data regarding the time of sunrise for each day of the year. In preferred embodiments, the heating device begins heating of one chamber approximately one-half to one hour before sun rise. Advantageously, use of a controlled silicon heater can increase efficiency of solar energy capture by up to ten percent over comparable passive tracker bases lacking such a controlled heater. In light of the above disclosure, a person of skill in the art will recognize that such a described heater can increase the efficiency of any solar system utilizing a passive tracker.

The tracker base further may include, for example, a support structure 506 and a stand structure 508. The support structure may include a mast 510, and axel, rails, and truss tubes. The mast, a feature of both the support structure and the stand structure, connects the support structure to the stand structure. The axel, rails, and truss tubes together connect the solar panels to the mast.

Figure 10:
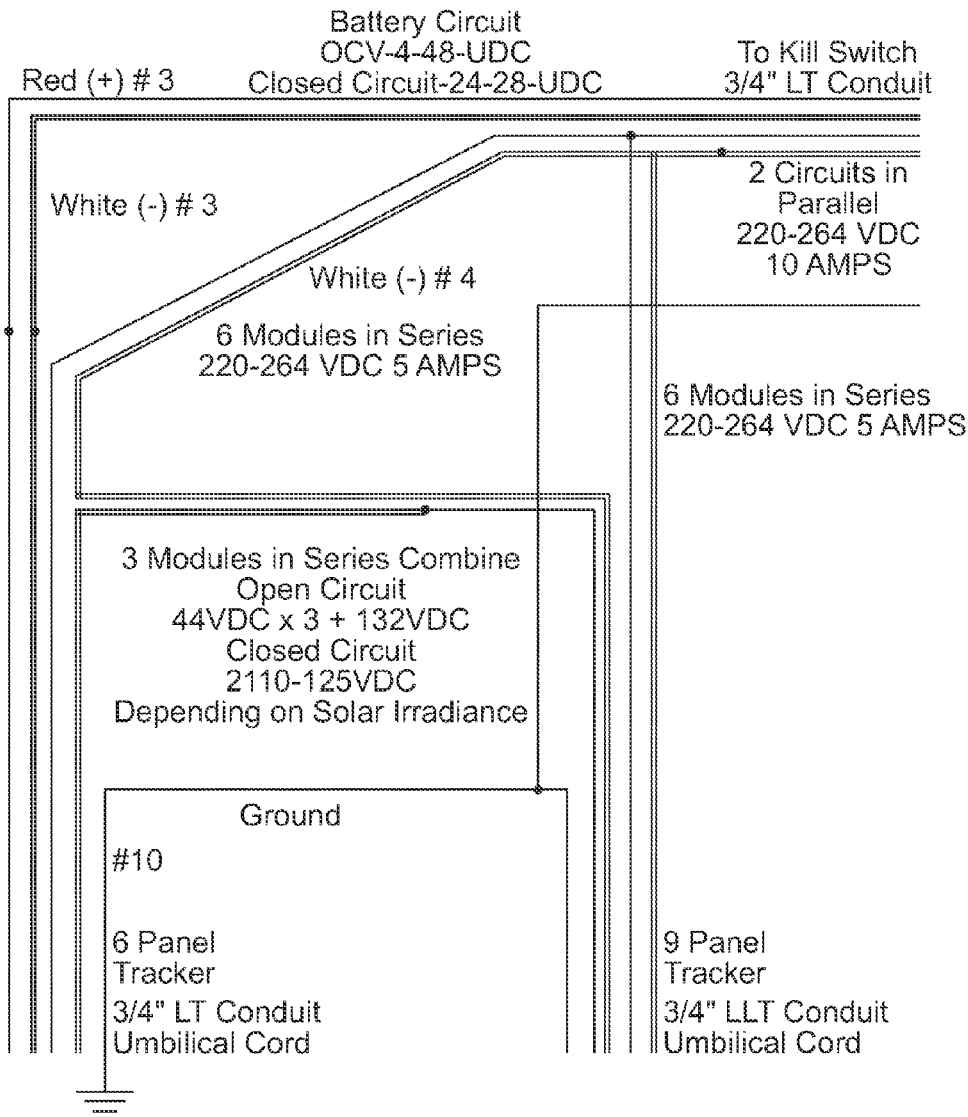
FIG. 10 is an example of a schematic of one layout of a junction box.

Support structure can further comprise wiring boxes configured joining wires from the solar panels to a lifeline, connecting the solar array to the filtration systems. In some embodiments, the lifeline can comprise at least four wires, a positive a negative wire for each of a first array of solar panels configured for powering the filtration systems and a second array of solar panels configured for powering the pump systems. FIG. 10 depicts one embodiment of a junction box connecting the solar array to the filtration systems. A person skilled in the art will further recognize that a lifeline, the junction box, and the tracker base and solar panels, as well as the entire reverse osmosis filtration system can comprise grounds and ground wires. To facilitate the effectiveness of a ground in a dry ground, and as described in greater detail above the earth surrounding the ground may be wetted. In some embodiments, this may be performed manually, while in other embodiments, a filtration system controller may control the wetting of the earth surrounding the ground.

Figure 11A:
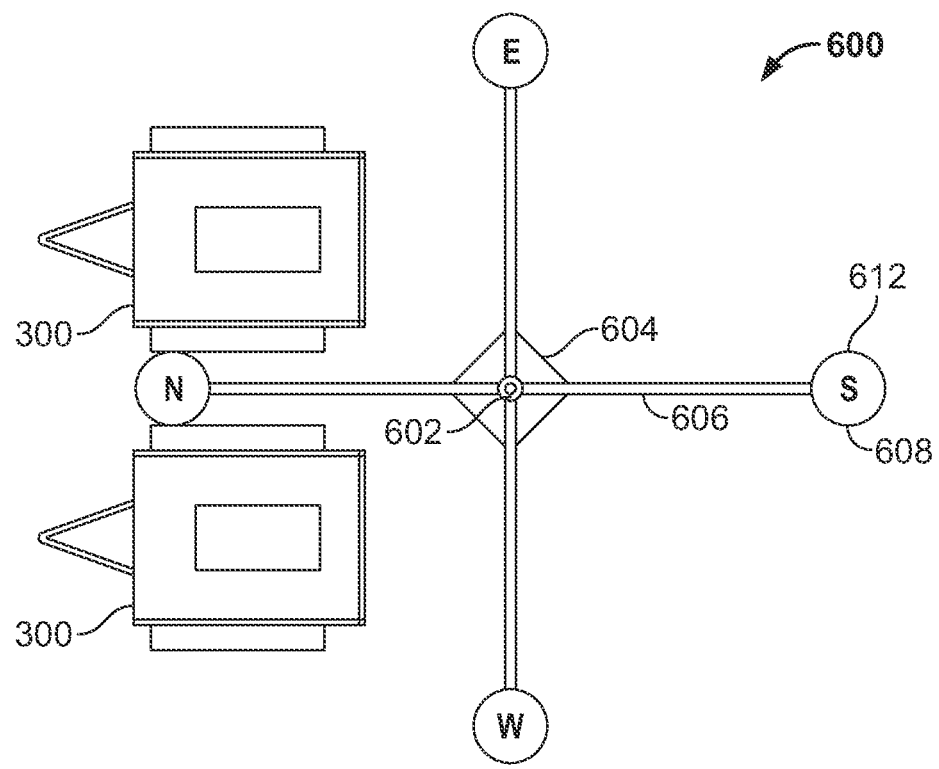
FIG. 11a is an example of top view of one embodiment of a tracker base.
Figure 11B:
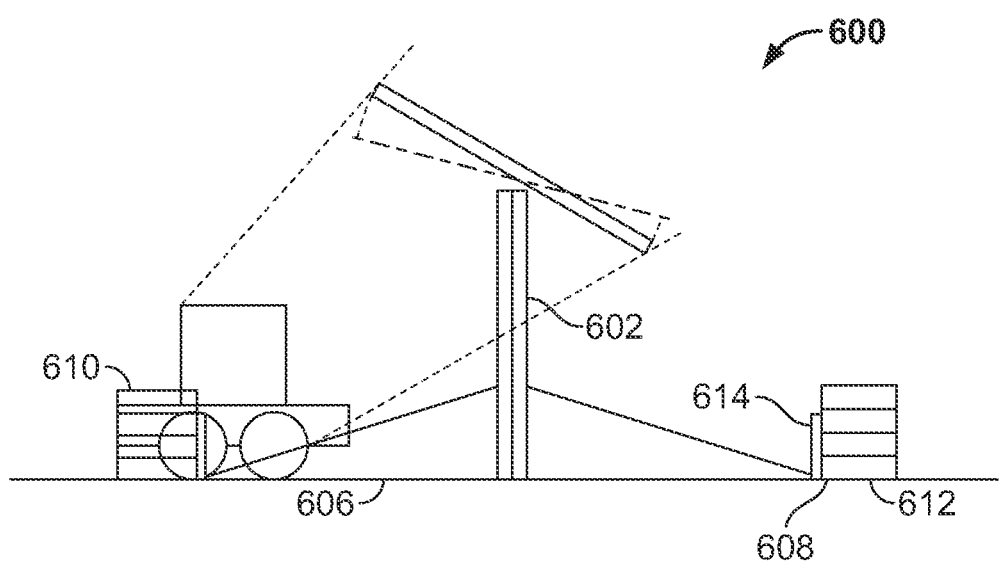
FIG. 11b is an example of a side view of one embodiment of a tracker base.

As illustrated in FIGS. 11a and 11b, the stand structure of a tracker base 600 may include, for example, the mast 602, a baseplate 604, outriggers 606, and barrel shoes 608. The base plate 604 is configured to be placed on the ground and affixed to the end of the mast 602. The baseplate 604 supports the mast 602, as well as the outriggers 606. In preferred embodiments, the baseplate 604 comprises a square steel plate. A person skilled in the arts will recognize that a baseplate 604 can comprise a broad range of materials and shapes. The outriggers 606 have a central end and a circumferential end. The central end is affixed to the mast. The outriggers further comprise a structural truss. The outriggers can comprise a variety of trusses, and can be made of a variety of materials. Preferred embodiments of an outrigger can include, for example, steel trusses.

The circumferential end of the outrigger can include, for example, a barrel shoe 608 configured for placement under a barrel 610. In preferred embodiments, the barrel shoe 608 may be placed under a 55 gallon barrel 610. The barrel shoe 608 further can include, for example, a horizontal plate 612 configured to be positioned under a barrel 610 and a vertical component 614 configured to extend vertically up the side of a barrel 610. In some embodiments of a tracker base 600, the barrel shoe 608 further comprises a strap to affix the barrel 610 to the barrel shoe 608. In some preferred embodiments, this strap may include, for example, a plastic ratchet strap. Advantageously, upon placement of the barrel 610 on top of the barrel shoe 608, the barrel can be filled with material to increase the downward force of the barrel 610 on the barrel shoe 608. This fill material provides the greatest benefit when it is a heavy material such as sand, water, rock, or dirt, but any material may be filled into the barrel to increase the stability of the solar energy system.

In some embodiments, a tracker base 600 can be positioned so that the solar arrays are oriented to true south. This orientation can be achieved by positioning the outriggers 606 such that each outrigger extends in a cardinal direction. Advantageously, such positioning of the outriggers 606 can orient the solar arrays towards true south, thus maximizing the amount of solar energy collected by the panel. In some aspects, the solar tilt of the solar array can be seasonally adjusted to maximize efficiency of the solar panels. In some embodiments of a solar array, this can comprise a 15 degree tilt in the summer, a 45 degree tilt in the winter, and a 32 degree tilt in the spring and fall.

The efficiency of a reverse osmosis system 100 can be further improved, in some embodiments, by placing the filtration system 300 and/or the reverse osmosis purification system 400 in the shade cone of the solar panel array. In embodiments in which the outriggers 606 are oriented towards cardinal directions, the filtration system 300 can be placed in the shade cone of the solar panel array by placing the filtration system next to the outer end of the northward facing outrigger 606 of the tracker base 600. A person skilled in the art will recognize that the scope of the present disclosure is not limited to the specific orientation of the tracker base 600 or the placement of the filtration system 300 relative to the tracker base 600.

Reverse Osmosis System

The reverse osmosis system and sub-systems thereof can be configured and sized to match the application in which it will be used. These configurations can include embodiments in which the reverse osmosis system is capable of producing a broad range of purified liquid. Additionally, various configurations of a reverse osmosis system can include locating some or all of the sub-systems, or components thereof on a single transportation platform or on multiple transportation platforms. Some further aspects of a reverse osmosis system can include mounting the sub-systems or their components on a single or on multiple deployment platforms.

Figure 12A:
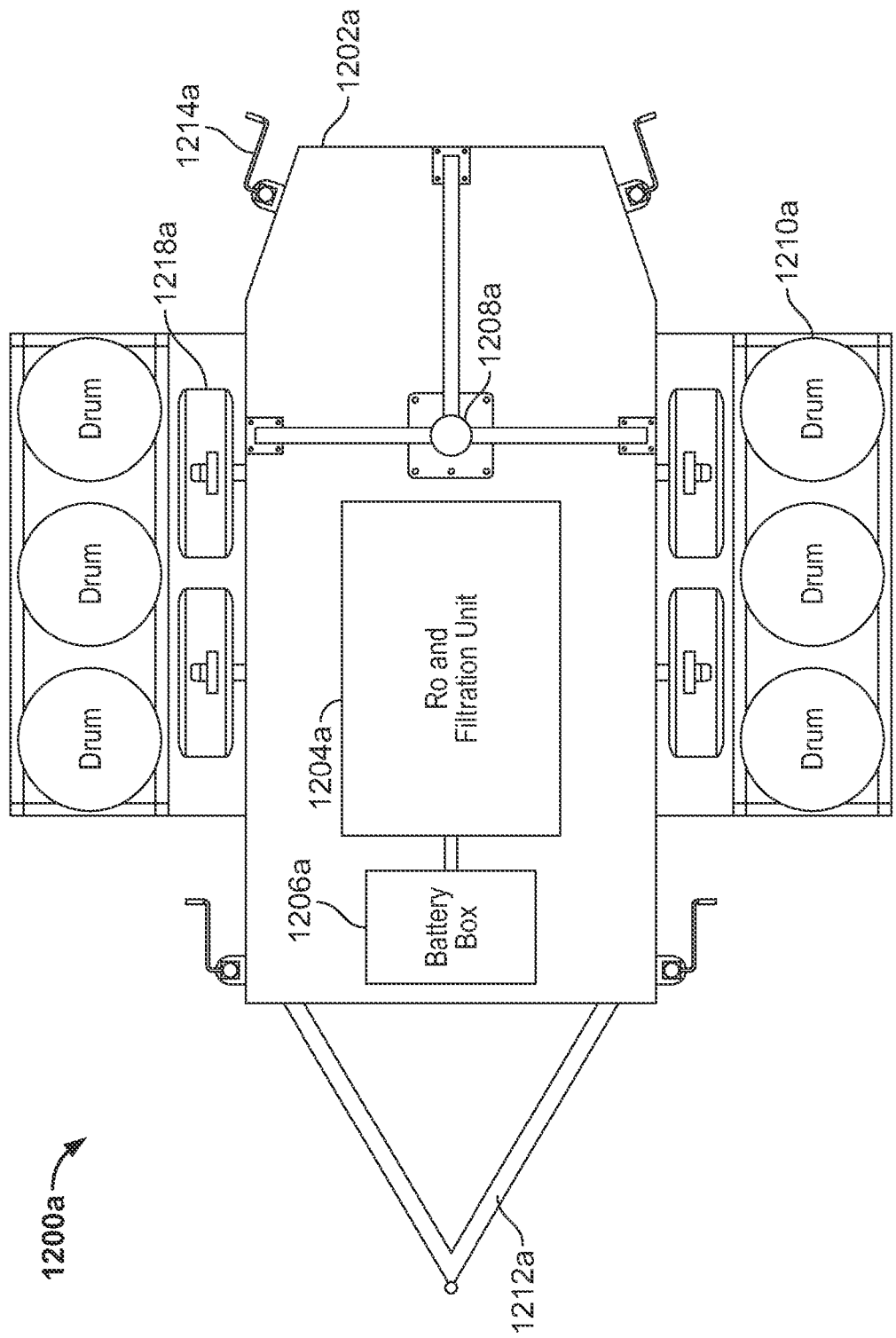

FIGS. 12a-12g depict aspects of some embodiments of a reverse osmosis system in which all of the sub-systems are located on a single transportation and deployment platform. FIG. 12a depicts a reverse osmosis system 1200a located on a trailer 1202a. A person skilled in the art will recognize that the present disclosure is not limited to the specific details of the trailer depicted in FIG. 12a, but that the disclosure encompasses a variety of transportation platforms in a variety of configurations.

In some embodiments, a reverse osmosis system and a water filtration system located in a single housing 1204a can be mounted on the trailer 1202a. In some embodiments, and as depicted in FIG. 12a, the trailer 1202a can be, for example, tire 1216a mounted. As discussed above, a housing 1204a can be made of a variety of materials and sized and shaped to match the application in which the reverse osmosis system 1200a will be used.

A battery box 1206a and a tracker mast 1208a configured for connection with a solar power system can also be mounted on the trailer 1202a in some embodiments of a reverse osmosis system. In some additional embodiments, the battery box 1206a and the solar power system can be electrically connected with the water filtration system and the reverse osmosis purification system.

A trailer 1202a can additionally include, in some embodiments, at least one storage container 1210a. FIG. 12a depicts six storage containers 1210a laterally located adjacent the trailer 1202a. Storage containers 1210a can serve a variety of purposes in different embodiments of a reverse osmosis system 1200a. In some embodiments, storage containers 1210a can, for example, ballast the trailer 1202a. In these embodiments, storage containers can be filled with any material, including water, sand, earth, rock, glass, or metal, to ballast, and thereby stabilize, trailer 1202a. In some embodiments, storage containers 1210a can be barrels, drums, or any other container, for example.

In other embodiments, storage containers 1210a can, for example, store process liquid. Storage containers 1210a can, for example, all store purified water. Alternatively, storage containers 1210a can, for example, be divided so that some number of storage tanks store water that has gone through the complete purification process and some number of water storage tanks store water that has only gone through portions of the purification process.

The storage tanks 1210a can be fluidly connected to, for example, the reverse osmosis system 1200a, to the reverse osmosis purification system, and/or to the water filtration system, or to the raw water supply. Additionally, the storage tanks 1210a can be interconnected to each other and thus jointly connected to a water source, or independently connected to a water source.

The storage tanks 1210a can also be connected to control circuitry of a reverse osmosis system 1200a as discussed above. A person skilled in the art will, however, recognize that the present disclosure is not limited to a specific number, size, or location of the storage containers 1210a. A person skilled in the art will further recognize that the present disclosure is not limited to the specifically disclosed liquid or control connection of the tanks 1210a to the trailer 1202a or the reverse osmosis system 1200a.

A trailer 1202a can additionally include, for example, a tongue and hitch 1212a for towing and a stabilizer 1214a.

FIG. 1212b depicts a back view of one embodiment of a reverse osmosis system 1200b mounted on a trailer 1202b. In some embodiments of a reverse osmosis system 1200b mounted on a trailer 1202b, the trailer 1202b can include at least one tire 1216b and a stabilization structure 1218b. The stabilization structure 1218b can extend laterally from the trailer and thereby increase the lateral stability of the trailer 1202b. In some embodiments, the stabilization structure can include, for example, a vertical attachment piece 1220b connected to the trailer 1202b, and a diagonal support 1222b and a horizontal support 1224b laterally extending from the vertical attachment piece 1220b. As depicted in FIG. 12b, the vertical attachment piece 1220b and the diagonal and horizontal supports 1222b, 1224b can be configured in a triangular shape. The components of the stabilization can comprise a variety of geometries and materials. In some embodiments, the components can comprise, for example, angle iron or steel or aluminum tubing. A person skilled in the art will recognize that a stabilization structure is not limited to the specific disclosure contained herein, but includes a variety of sizes, materials, and geometries.

The sub-box of FIG. 12b depicts a partial top view of a trailer 1202b configured for connection with a stabilization structure 1218b. As depicted in the sub-box, in some embodiments, a stabilization structure 1218b can be additionally configured to connect to storage containers 1210b. A person skilled in the art will recognize that a variety of techniques can be employed to connect storage containers 1210b to the stabilization structure 1218b.

Figure 12C:
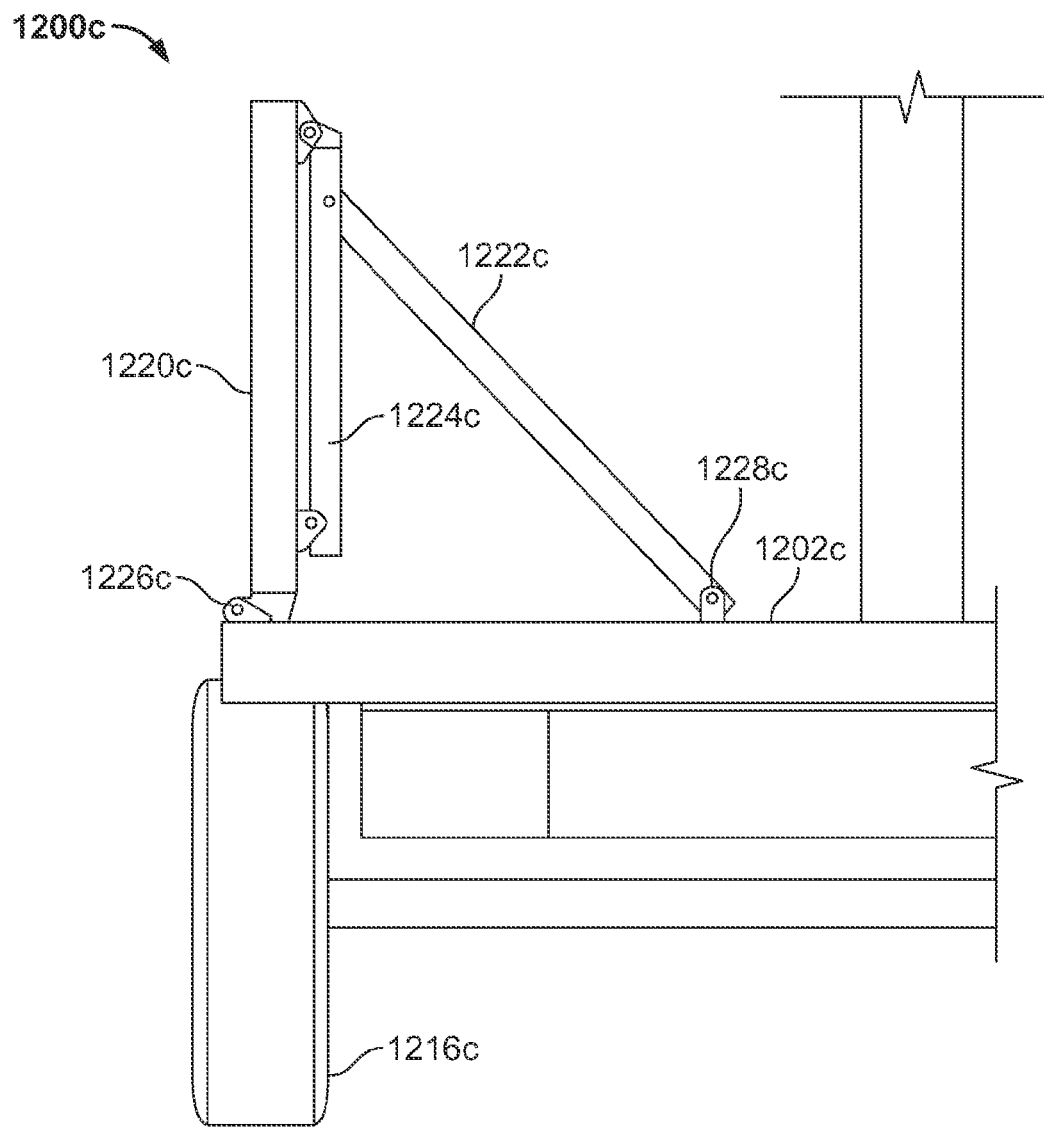

FIG. 12c depicts a second position of a stabilization structure 1218c. In some embodiments, a stabilization structure 1218c can be configurable into at least two positions. In some embodiments, a first position of a stabilization structure 1218c can be a deployed configuration in which the stabilization structure 1218c is positioned to provide support to the trailer 1202c, and a second position can be an undeployed configuration in which the stabilization structure 1218c is positioned to prevent interference with transport of the trailer 1202c. As depicted in FIG. 12c, a vertical attachment piece 1220c can be moveably attached to a trailer 1202 c. More specifically, a vertical attachment piece can, in some embodiments, pivotally attach to the trailer 1202c at a pivot point 1226c. As further depicted in FIG. 12c, a stabilization structure 1218c can be retained in an undeployed configuration by connecting diagonal support 1222c to attachment point 1228c. A person skilled in the art will recognize that a diagonal support can be attached to attachment point 1228c using a variety of techniques.

Figure 12D:
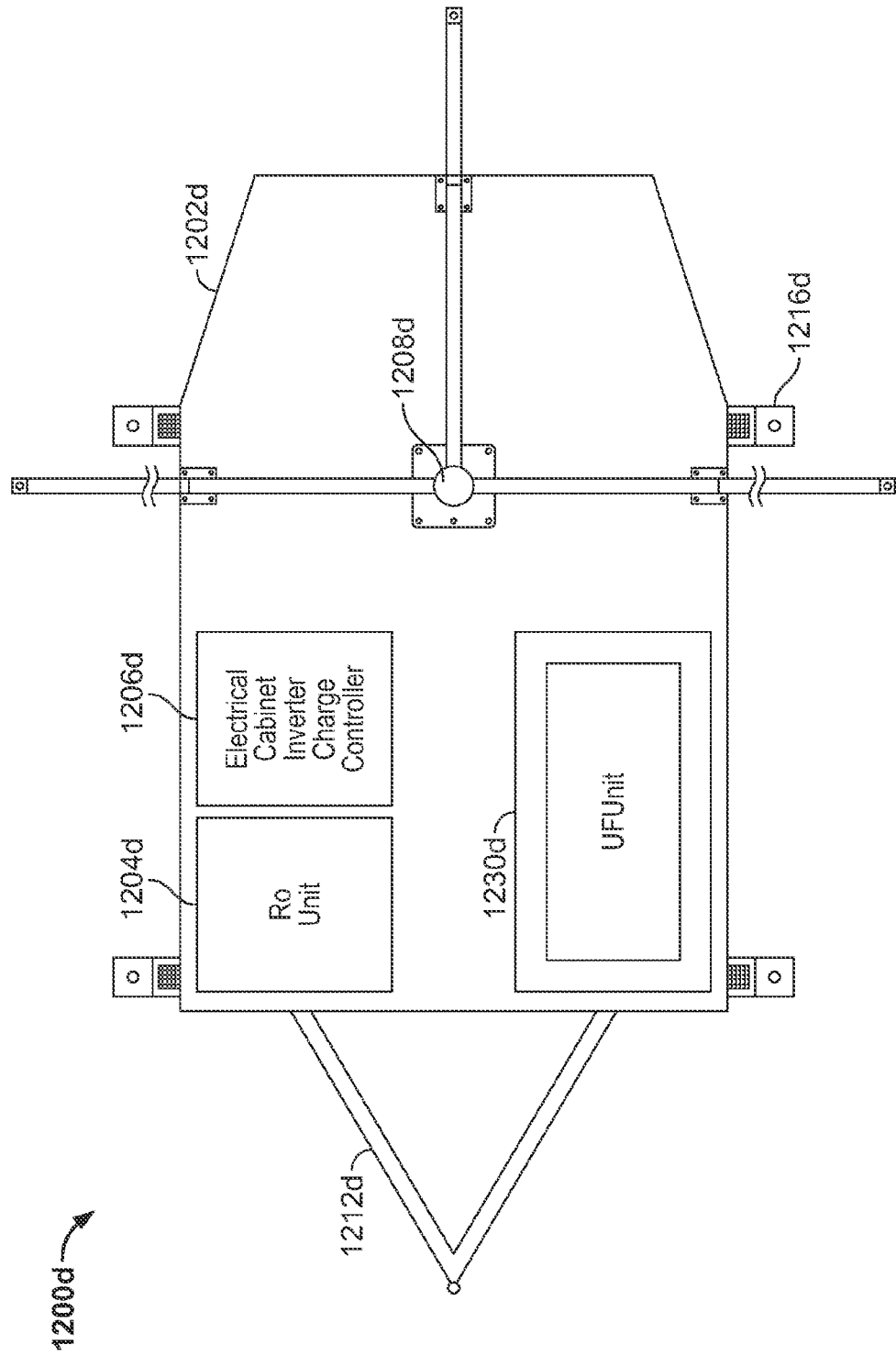

FIG. 12d depicts another embodiment of reverse osmosis system 1200d located on a trailer 1202d. A person skilled in the art will recognize that the present disclosure is not limited to the specific details of the trailer depicted in FIG. 12d, but that the disclosure encompasses a variety of transportation platforms in a variety of configurations.

In some embodiments, a reverse osmosis purification system can be located in a housing 1204d and a water filtration system can be located in a separate housing 1230d, both of which housings 1204d, 1230d can be mounted on the trailer 1202d. In some embodiments, and as depicted in FIG. 12d, the trailer 1202d can be, for example, stabilizer 1218d mounted. In some embodiments, a stabilizer can further include shoe and can be used, for example, in connection with a screw anchor and pin, or other anchoring method. As discussed above, a housing 1204d can be made of a variety of materials and sized and shaped to match the application in which the reverse osmosis system 1200d will be used.

In some additional embodiments of a trailer 1202d mounted reverse osmosis system 1200d, an electric cabinet 1206d and a tracker mast 1208d configured for connection with a solar power system can also be mounted on the trailer 1202d. In some embodiments, the electric cabinet 1206d can be configured to hold a variety of electrical components of the reverse osmosis system including, for example, at least one battery, at least one charge controller, at least one inverter, or any other electrical components. In some additional embodiments, the electric cabinet 1206d and the solar power system can be electrically connected with the water filtration system and the reverse osmosis purification system.

A trailer 1202d can additionally include, for example, a tongue and hitch 1212d for towing.

A trailer 1202d can be deployed in a variety of orientations. In some embodiments, and as depicted in FIG. 12d, a trailer can be oriented so that the tongue and hitch 1212d of the trailer are pointed north. This orientation can increase the shading of the reverse osmosis filtration system and the water filtration system. However, a person skilled in the art will recognize that a trailer 1202d mounted reverse osmosis system 1200d can be deployed in a variety or orientations.

FIG. 12e depicts one embodiment of a solar power system 1232e mounted on a mast 1208e of a trailer 1202e for use in connection with a reverse osmosis system 1200e. A person skilled in the art will recognize that the dimensions of the sub-systems and components of the reverse osmosis system 1200e can be coordinated so as to enable the non-interfering placement sub-systems and components on a trailer 1202e. As depicted in the figure, the solar power system can be pivotally mounted to the mast, having at least two positions. In a first position, the solar power system 1232e can be oriented parallel to the top 1234e of the trailer 1202e. This position can be used in moving the trailer 1202e as the parallel position decreases the frontal area of the solar power system 1232e and thereby decreases any aerodynamic forces experienced by the solar power system 1232e. In some embodiments the solar power system 1232e can be configured into a second position. As depicted in FIG. 12e, in some embodiments, a second position comprises orienting the face of the solar power system 1232e to the south and moving the solar power system 1232e from parallel with the top 1234e of the trailer 1202e to an angle of approximately thirty degrees.

Figure 12F:
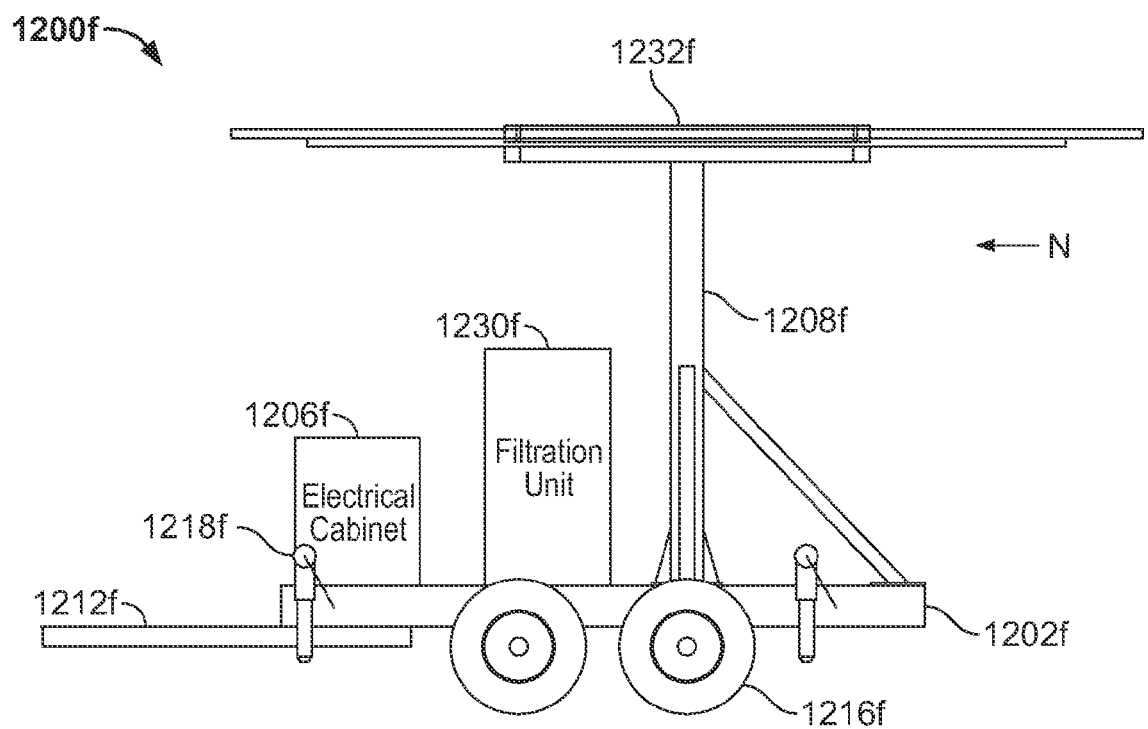

FIG. 12f depicts a side view of one embodiment of a trailer 1202f mounted reverse osmosis system 1200f including an electric cabinet 1206f, a housing for a filtration system 1230f, a mast 1208f, tires 1216f, stabilizer 1218f, solar power system 1232f, and tongue and hitch 1212f. FIG. 12f further depicts some examples of dimensions for some aspects of a trailer 1202f mounted reverse osmosis system 1200f. A person skilled in the art will recognize that the present disclosure is not limited to the dimensions or other aspects depicted in FIG. 12f.

Figure 12G:
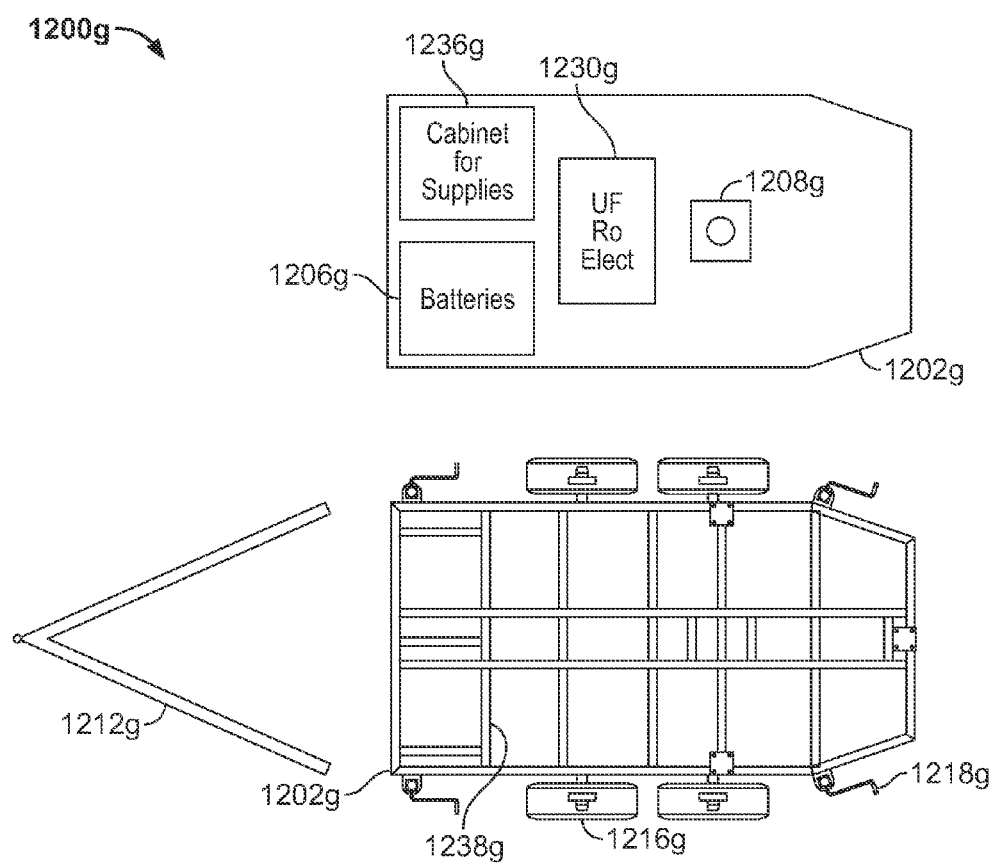

FIG. 12g depict top and bottom views of one embodiment of a trailer 1202g mounted reverse osmosis system 1200g including an electric cabinet 1206g, a supply cabinet 1236g, a housing for a reverse osmosis purification system and a filtration system 1230g, a tracker tower base 1208g, tires 1216g, stabilizer 1218g, trailer structural members 1238g, and tongue and hitch 1212g. FIG. 12g additionally depicts some embodiments of alternate jack stands that can be used in connection with the trailer 1202g mounted reverse osmosis system 1200g. FIG. 12g further depicts some examples of dimensions of some aspects of a trailer 1202g. A person skilled in the art will recognize that the present disclosure is not limited to the dimensions or other aspects depicted in FIG. 12g.

Surprisingly, experiments with the reverse osmosis system 100, and subsystems of the reverse osmosis system 100, in which heat energy is captured, manipulated, and distributed to control component and system temperatures have resulted in significant increases in system efficiency as well as in component efficiency. Thus, the system is able to function at fixed production rates using less energy or to process liquids at higher rates using the same amount of energy. In some aspects, this efficiency is the result of capturing energy from sources that have previously not been recognized as useful energy sources, and transferring this energy to aspects of a system in which the energy can be beneficially used. Also surprisingly, the combination of energy from these diverse sources results in a synergistic improvement in efficiency above what would be expected based on the individual amounts of energy captured from each source. The energy transfer techniques described herein can be applied to any of the systems, subsystems, components and subcomponents described herein.

A person skilled in the art will recognize that each of these sub-systems can be inter-connected and controllably connected using a variety of techniques and hardware and that the present disclosure is not limited to any specific method of connection or connection hardware.

The technology is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A microprocessor may be any conventional general purpose single- or multi-chip microprocessor such as a Pentium® processor, a Pentium® Pro processor, a 8051 processor, a MIPS® processor, a Power PC® processor, or an Alpha® processor. In addition, the microprocessor may be any conventional special purpose microprocessor such as a digital signal processor or a graphics processor. The microprocessor typically has conventional address lines, conventional data lines, and one or more conventional control lines.

The system may be used in connection with various operating systems such as Linux®, UNIX® or Microsoft Windows®.

The system control may be written in any conventional programming language such as C, C++, BASIC, Pascal, or Java, and ran under a conventional operating system. C, C++, BASIC, Pascal, Java, and FORTRAN are industry standard programming languages for which many commercial compilers can be used to create executable code. The system control may also be written using interpreted languages such as Perl, Python or Ruby.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A system for purification of water, the system comprising:
   a pump unit configured to generate sufficient pressure to process fluid through a reverse osmosis unit at a desired rate; the pump unit comprising:
   a pump;
   a shroud extending over at least a portion of an outside circumferential edge of the pump, wherein the shroud comprises channels configured for through-flow of a process fluid;
      wherein the pump is configured for through-flow of the process fluid to cool the pump; and
   a pump controller configured to receive power from at least one solar panel, the pump controller further configured to control the pump by regulating power from the at least one solar panel to the pump, wherein the pump controller is thermally connected to a pump controller radiator, the pump controller radiator comprising channels configured for through-flow of the process fluid, wherein the pump controller radiator transfers heat from the pump controller to the process fluid;
      wherein the shroud and the pump controller radiator are configured to heat the process fluid in order to decrease the pressure differential required to move the process fluid across a reverse osmosis membrane of the reverse osmosis unit to purify the process fluid.

2. The system of claim 1, the system further comprising a heat transfer device configured to collect ambient heat to additionally transfer heat to the process fluid.

3. The system of claim 2, wherein the heat transfer device is further configured to transfer heat to the reverse osmosis unit.

4. The system of claim 2, wherein the heat transfer device further comprises a water heating solar panel.

5. The system of claim 1, the system further comprising an array of solar panels configured to generate a desired range of electrical power.

6. The system of claim 1, wherein the system is configured to be powered by one of at least one generator, at least one battery, or electricity from at least one electric grid.

7. The system of claim 1, wherein the process fluid is pre-filtered.

8. The system of claim 1, wherein the process fluid is raw.

9. The system of claim 1, wherein the pump unit is configured to generate a pressure of 25-500 psi.

10. The system of claim 1, wherein the pump unit is configured to generate sufficient pressure to process the fluid through a reverse osmosis unit at a rate of 0.1-1500 gallons per minute.

11. A method of purifying water using the system of claim 2, the method comprising:
   heating the process fluid by passing the process fluid through the pump unit, wherein the efficiency of the pump unit increases by transferring heat from the pump unit to the process fluid;
   heating the process fluid by passing the process fluid through the heat transfer device, wherein the efficiency of the pump controller increases by transferring heat from the pump controller to the process fluid; and,
   purifying the process fluid by diffusing a portion of the process fluid through at least one reverse osmosis membrane of the reverse osmosis unit, wherein the pressure differential required to diffuse a portion of the process fluid across the reverse osmosis membrane is decreased by the increased temperature of the process fluid.

12. The method of claim 11, wherein a thermostat is coupled to the heat transfer device to maintain a range of designated temperatures of the process fluid.

13. The method of claim 11, wherein the heat transfer device comprises a solar water-heating panel.

14. The method of claim 11, the method further comprising transferring heat through the heat transfer device from the process fluid to the interior of a housing surrounding the reverse osmosis membrane.

15. The method of claim 14, wherein a thermostat is coupled to the heat transfer device to maintain a range of designated temperatures within the housing.

* * * * *